(12) United States Patent
Russell

(10) Patent No.: US 6,672,565 B2
(45) Date of Patent: Jan. 6, 2004

(54) DUAL SNAP ACTION FOR VALVES

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 97 days.

(21) Appl. No.: 09/824,374

(22) Filed: Apr. 1, 2001

(65) Prior Publication Data

US 2001/0035220 A1 Nov. 1, 2001

Related U.S. Application Data

(60) Provisional application No. 60/194,204, filed on Apr. 3, 2000.

(51) Int. Cl.⁷ .............................................. F16K 31/56
(52) U.S. Cl. ........................................ 251/297; 251/58
(58) Field of Search ..................... 251/297, 58; 137/494

(56) References Cited

U.S. PATENT DOCUMENTS

| | | | |
|---|---|---|---|
| 2,198,386 A | * 4/1940 | Hiester et al. ............... | 251/297 |
| 2,655,935 A | 10/1953 | Kinzbach | |
| 2,698,731 A | * 1/1955 | Koehler et al. ............. | 251/297 |
| 2,973,777 A | 3/1961 | Troxell, Jr. | |
| 3,013,531 A | 12/1961 | Mueller et al. | |
| 3,036,590 A | * 5/1962 | Knox .......................... | 251/297 |
| 3,070,119 A | 12/1962 | Raulins | |
| 3,126,908 A | 3/1964 | Dickens | |
| 3,174,500 A | 3/1965 | Johnson et al. | |
| 3,273,588 A | * 9/1966 | Dollison ..................... | 251/297 |
| 3,646,957 A | 3/1972 | Allen | |
| 3,749,119 A | 7/1973 | Tausch et al. | |
| 3,827,671 A | 8/1974 | Bolden | |
| 3,885,627 A | 5/1975 | Berry et al. | |
| 3,888,278 A | 6/1975 | Hanks | |
| 3,889,751 A | 6/1975 | Peters | |
| 3,892,258 A | 7/1975 | Hendrick | |
| 3,902,523 A | 9/1975 | Gaut | |
| 4,026,314 A | 5/1977 | Turner et al. | |
| 4,077,473 A | 3/1978 | Watkins | |
| 4,130,166 A | 12/1978 | Akkerman et al. | |
| 4,133,186 A | 1/1979 | Brucken et al. | |
| 4,160,484 A | 7/1979 | Watkins | |
| RE30,063 E | 8/1979 | Turner et al. | |
| 4,201,242 A | 5/1980 | Troxell, Jr. | |
| 4,240,458 A | 12/1980 | Huff | |
| 4,339,001 A | 7/1982 | Paschal, Jr. | |
| 4,508,173 A | 4/1985 | Read | |
| 4,530,485 A | 7/1985 | Yonker | |
| 4,664,195 A | 5/1987 | Deaton | |
| 5,050,839 A | 9/1991 | Dickson et al. | |
| 5,255,711 A | 10/1993 | Reeds | |
| 5,465,786 A | 11/1995 | Akkerman | |
| 5,575,193 A | 11/1996 | Bareis et al. | |
| 5,657,784 A | 8/1997 | Martens | |

* cited by examiner

*Primary Examiner*—John Fox
(74) *Attorney, Agent, or Firm*—Elizabeth R. Hall

(57) ABSTRACT

An actuating means for a valve that is both opened and closed with a snap-action. The bidirectional, bi-stable snap acting valve has adjustable resistive forces governing the snap action of the valve. The bi-stable snap action mechanism can be incorporated into the operation of the valving element or the valving actuators.

14 Claims, 21 Drawing Sheets

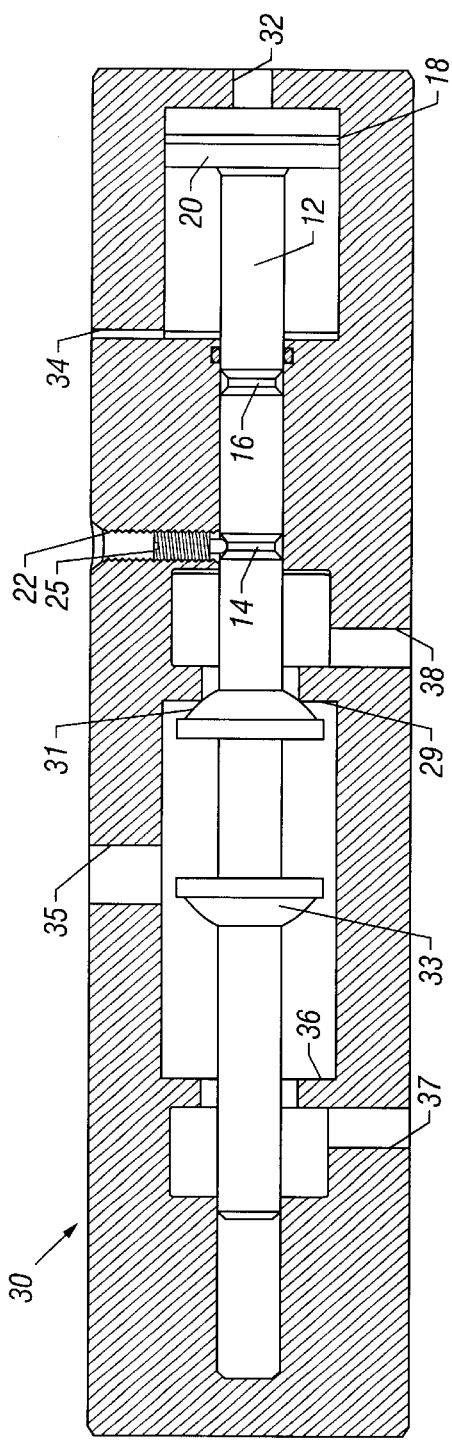
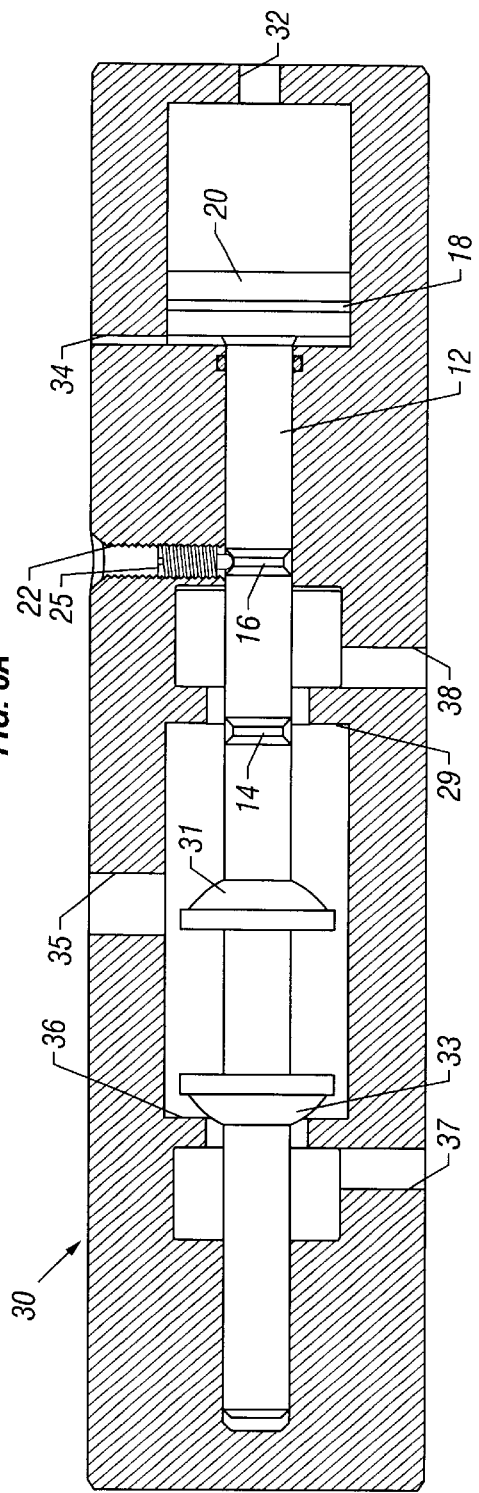
FIG. 5A
FIG. 5B

DUAL SNAP ACTION FOR VALVES

CROSS-REFERENCE TO RELATED APPLICATION

The present application, pursuant to 35 U.S.C. 111 (b), claims the benefit of the earlier filing date of provisional application Ser. No. 60/194,204 filed Apr. 3, 2000, and entitled "Mudsaver Valve with Dual Snap Action". The present application is related to the concurrently filed patent application entitled "Mudsaver Valve with Dual Snap Action."

BRIEF DESCRIPTION OF THE INVENTION

The present invention relates to valves that are both opened and closed with a snap-action. More particularly, the invention relates to bi-stable snap action for valves or their actuators where the retaining force governing the snap action of the valve is adjustable.

BACKGROUND OF THE INVENTION

Certain types of valves have severely attenuated lives if they are not fully open or fully closed. Severe wear occurs when the valve is in an intermediate position for a sustained period. Thus, there has been a recognized need for a repeatable, stable snap action in valves.

Several types of bi-stable mechanisms previously disclosed in other patents are discussed below, including Belleville spring washers, canted biasing springs with angularly varying lines of action, magnetically-biased valves, and spring-biased ball latches or collet latches.

Belleville spring washers with ratios of initial axial offset (from flat)-to-thickness greater than the squareroot of 2 have the unusual property of decreasing load with increased deflection for deflections beyond a certain critical deflection value. If a biasing spring for a valve or valve actuator is predeflected (preloaded) to or beyond that critical value, then whenever the actuating load exceeds that corresponding force, the biasing spring resistance collapses and a snap-through action occurs. Belleville springs, however, can only withstand small deflections. While it may appear that using a stack of similar Belleville springs in series will permit obtaining larger deflections, the random critical load values from an assortment of superficially identical Belleville springs make the obtaining of predictable behavior essentially impossible. This is because the stronger springs will exert higher forces than can be resisted by the weaker springs when the series is preloaded to near its nominal critical value. As a result, the weaker springs fully collapse sequentially, thereby unloading the stronger springs to below their critical values. For this reason, as well as the high friction associated with a large stack of Bellville springs, the mechanism using multiple Belleville springs shown in FIG. 1 of Kinzbach U.S. Pat. No. 2,655,935 is unworkable as an effective snap-through device. Practical short-deflection valves can successfully apply single Belleville springs in snap-through configurations for valve biasing (e.g., U.S. Pat. Nos. 3,892,258, 4,133,186, and 5,255,711). Thus, Belleville springs do not appear to offer snap-action potential for valves requiring more than minimal displacement or relief valves based on rotating ball valves.

The use of canted biasing springs with angularly-varying lines of action is another means by which snap action has been sought. When a coil compression spring has one end anchored against translation but has both ends free to rotate about axes normal to a plane defined by the spring axis and the axis of translation of the non-fixed end of the spring, then a snap-through action can be obtained. This snap-through occurs for angles between the spring axis and the axis of translation of the non-fixed spring end exceeding a critical magnitude. FIG. 7 of Kinzbach (U.S. Pat. No. 2,655,935) displays a relief valve based upon this type of spring biasing with multiple springs. The Kinzbach arrangement attempts to provide snap action both for opening and closing, but its travel is limited so that it is always biased to move to reseat the valve. This limit on travel is such that the springs do not travel past the point where their thrust direction reverses, so that the open position of the valve is not stable.

Turner et al. (U.S. Pat. No. 4,026,314) discloses a single-spring biased valve. This valve does travel past the point where the direction of spring bias on the valve is reversed. For this arrangement, the Turner valve must be manually reset by forcing the spring to move back to its original position with the spring bias direction restored to its original orientation. The primary drawback to the application of canted springs for snap through action in a valve is the relatively large radial spatial requirements for housing such an arrangement. The spatial requirements are increased if stronger springs or more travel are required.

Magnetically biased valves are another means by which controllable snap action for valves has been sought. A magnet with its poles oriented to attract a piece of magnetic material exhibits an attractive force which increases with its approach to that piece; the converse is true for increasing separation. This relatively rapid loss of attractive force with increasing separation distance or gain of attractive force with decreasing separation is well suited to providing snap-action behavior. This phenomena has been used to retain a spherical plug on a seat for an emergency shutoff valve disclosed in Japanese Patent 09042505 A. The spherical plug is not strongly held, so that it can be readily displaced by transverse or angular accelerations such as those which might occur in a strong earthquake. The sphere is able to roll slightly downhill after displacement, where it may be held displaced by gravity and/or its attraction to a peripherally placed housing wall. However, the unseating motion for this device is not well-controlled, so that reseating can accidentally occur, depending on the character of the shaking of the valve.

Another type of magnetically latched valve is shown in Mueller et al. (U.S. Pat. No. 3,013,531). This device is a snap acting reversing valve used in a grease gun. A piston is driven by the fluid controlled by the snap acting valve. Toward either end of the stroke of that piston, a lost-motion coupling connected to that piston by a spring on each side is caused to overcome magnetic biasing force on the actively attracted one of a pair of similar, opposed valve poppets so that the valve is shifted. This device relies on a lost-motion coupling between the driving piston and the valving, and the magnetic attraction is directly between the valve sealing member and its seat.

Other means used to provide snap action are spring-biased latches or collet latches in valves. Tausch et al. (U.S. Pat. No. 3,749,119) discloses a valve reopening operator sleeve retained in either an upper position or a lower position by the engagement of annular latch grooves with an annular garter spring. Although closure of the main valve is not impacted by the sleeve, the reopening of the valve is. Shifting of an independent inner sleeve, mounted within the valve reopening sleeve, downwardly to a first position permits closing an activator valve at the upper end of the reopening sleeve. The closure of the activator valve permits the reopening sleeve to be pumped downwardly from its upper position to its lower position to force open the main valve. The reopening sleeve is disengaged from its lower position by independent upward movement of the main control sleeve. The main valve and the activator valve are both flapper valves and are both spring-biased closed. The garter spring does not cause snap action in this application, but rather serves as a releasable retainer on a secondary operator.

Raulins (U.S. Pat. No. 3,070,119), Dickens (U.S. Pat. No. 3,126,908), and Peters (U.S. Pat. No. 3,889,751) all disclose valves using latches for snap action.

Raulins has a latch based on spring-loaded balls which act directly on the sealing poppet of the valve to provide snap action closure only. The sealing poppet of the valve is loaded by pressure drop across an integral internal flow bean. This load is supported by an annular array of balls which are spring-biased inwardly to engage a shoulder on the sealing poppet. The biasing load on the balls is provided by a very large axial force from an axially-acting coil spring bearing on a conically tapered ball support ring. The snap action is only in one direction and is actuated by forces applied to the sealing member, rather than an independent actuation mechanism.

The Peters apparatus is similar to that of Raulins, but the latch arrangements differ. Peters permits the sealing plug to move a limited amount prior to closing and uses axially translating balls that shift from one groove to another to release. Raulins permits substantially no sealing plug movement prior to latch release and does not use axially translating balls. The Dickens apparatus relies on an actuator with either a collet latch or ball latch released by movement to a disengagement groove under flow forces. A lost motion mechanism is required to link the actuator to the valve in order to accommodate the movement without affecting valve position. A very high axial bias force on the latch mechanism is required. The valve closing and opening require high flows to occur, so that reliable snap action is not a certainty with this device.

Watkins (U.S. Pat. No. 4,160,484) discloses a flapper-type valve in which the flapper is biased to be normally closed, but is held open by a tube latched by a collet mechanism which releases at a predetermined load. The valve functions independently of the tube when the tube is not in position to paralyze the valve. The collet serves only to retain the tube in position and the latch does not provide for snap action.

Not one of the described valves has a stable snap action in both directions (i.e., opening and closing the valve).

There is a need for a stable bidirectional snap action valve that will be more reliable and provide longer operational service.

SUMMARY OF THE INVENTION

The invention contemplates a simple, inexpensive device for solving the problems and disadvantages of the prior approaches discussed above. The present invention provides a mechanism for a quick, automatically-operating, snap acting opening and closing valve which is resistant to wear.

One aspect of the present invention is a valve having a bidirectional, bi-stable snap action mechanism for opening and closing.

Another aspect of the present invention is a linear valve having a pair of detents spaced along the length of the valve actuator, wherein a biasing force engages either one or the other detent upon the opening or closing of the valve.

Yet another aspect of the present invention is a ball valve having a number of detents on the ball, wherein a biasing detenting force engages different detents for the open and closed positions of the valve.

Still yet another aspect of the present invention is a ball valve having a number of detents along the length of the valve actuator, wherein a biasing detenting force engages different detents for the open and closed positions of the valve.

Another aspect of the present invention is a valve actuator having a force responsive piston; an actuator housing with a biasing means mounted therein; and a reciprocally movable actuator rod attached to and driven by the force responsive piston and having two detents axially spaced to correspond to a distance between a first and second actuator end position, wherein the biasing means engages a first detent when the actuator is in its first end position and a second detent when said actuator is in its second end position, such that an actuating force applied by the piston that is sufficient to disengage the biasing means and the detent is sufficient to move the actuator fully to the other end position.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its structure and methods of operation, together with the objects and advantages thereof, will be better understood from the following description taken in conjunction with the accompanying drawings, wherein:

FIG. 5A is a longitudinal sectional view of a double poppet valve with dual snap action in a first position;

FIG. 5B is a longitudinal sectional view of a double poppet valve with dual snap action in a second position;

DETAILED DESCRIPTION OF THE INVENTION

Figure 1A:
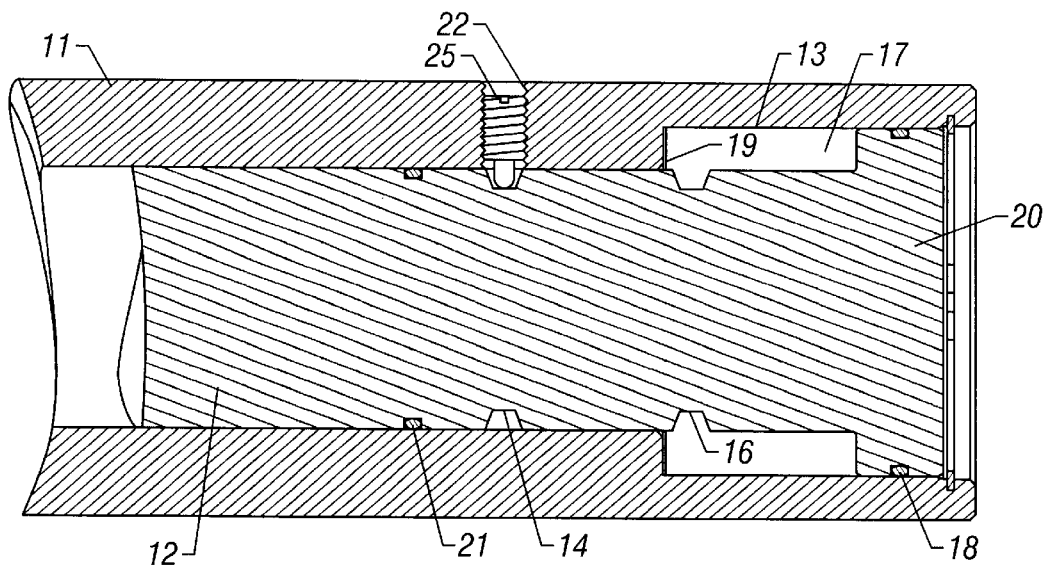
FIG. 1A shows a longitudinal section of an actuator of an open valve, where the actuator has two detents and a spring pin providing biasing detenting force is engaged in one detent.

The present invention is related to bidirectional snap action valves having long-stroke valve movements, such as a valve that is opened or closed with the stoke of a piston actuator or a rotary actuator.

Certain types of valves function as two-position valves and are not required to modulate or control flow except for fully open or fully closed positions. As an example, ball valves are generally only used for this type of on/off service. A partially open valve can cause transverse flow and cavitation, resulting in severe seat, ball and body erosion. When valves are used to control the flow of abrasive fluids, such as drilling mud or fluid with particulates, the erosion problem is enhanced. For a two-position valve operated with an actuator subject to either or both variable forcing and resistance, the transition between the open and closed positions is not necessarily smooth or reliable. In such cases, the valve may linger for a sustained period in a partially open condition, significantly shortening the operational life of the valve and limiting its functional reliability.

The present invention improves the reliability of a two-position valve subject to variable actuation forces and/or resistance, by providing sufficient biasing against the opening or closing of the valve so that the valve does not move until sufficient force exists to ensure valve movement monotonically and fully from one end position to the other. The resultant behavior is commonly termed "snap action."

The term "bi-stable valve" is defined herein as a valve having an open and a closed state, where the departure from one stable state is followed by transition to the other stable state when the perturbing force is substantially invariant. This definition differs from the common definition of bi-stability, which refers to dislocation from a stable state followed by transition to either of two possible stable states.

A variety of mechanisms are suitable for bidirectional snap action in valving, although some are not suitable for long-stroke valve movements. In order to obtain bi-stable snap action for a valve or its actuator, it is necessary to meet four conditions for both the opening and closing travel directions. These conditions are: 1) an end travel stop must be provided at each limit of motion; 2) The actuator must be coupled to the valving element (although the coupling may provide lost motion); 3) for each direction of travel, a biasing force which opposes motion and tends to hold either the actuator or valving member against the end travel stop as the actuator translates from either end position; and 4) a critical level of actuating force must be applied in the direction of travel such that the resisting and biasing forces are exceeded throughout the length of travel for either direction of travel.

These four criteria for bi-directional bi-stable snap action can be provided by a variety of bi-stable mechanisms and varied means of applying the resultant forces to the actuating operator of the valve or directly to the valve sealing element.

The present invention provides for a bi-stable snap actuation means for causing the valving member to move completely between two alternate positions if and only if a trigger level of actuation force is exceeded. The present invention is applicable to quarter-turn valves (i.e., valves which require a 90° turn of the valve stem to operate) such as ball or rotary plug valves, or valves which linearly translate from a seated to an unseated position, such as poppet valves or from a first flow port registration to a second, such as spool valves.

For the Examples described below, single-acting actuators which rely upon springs and/or gas springs for return forces are typically shown. However, it may be readily understood that any of these bi-stable, bidirectional actuators could be made double acting by selectably applying fluid pressure to the piston face which would be spring or gas-spring biased for a single acting actuator. Further, it is readily seen that these bidirectional, bi-stable linear detenting means can easily be reconfigured for rotary actuators.

Referring now to the drawings, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

Application of Snap Action Means to Linearly Translating Valves

One aspect of the present invention is the application of bi-stable snap action mechanisms to linearly translating valves where the bi-stable snap actuation means is located on the actuator. For example, the actuator may have a reciprocating cylindrical rod with two annular grooves or detents spaced apart axially by the distance of the actuator stroke. A spring-loaded means is positioned to interact with the grooves. A number of suitable spring-loaded means are known to those skilled in the art, with the application of a few types of spring-loaded means discussed below.

The spring-loaded means can enter and engage a grooved detent at either end of the actuator rod stroke. The snap action of the valve is accomplished because the axial force from the actuator required to unseat the spring-loaded means from the detent to move the actuator rod to the next detent, combined with any other resistive and biasing forces, everywhere exceeds the force required to fully move the rod from one position to the other position after escape of the spring loaded means from its detent (i.e., to open or close the valve). This is true because the forces from the spring loaded means resisting the movement of the rod between detents is almost negligible compared to the forces resisting the movement of the rod when the spring-loaded means is engaged in a detent. The force resisting the movement of the actuator rod when the spring-loaded means is engaged in a grooved detent is controlled by: a) the depth and width of the detent or groove, b) the exit slope of the groove, c) the stiffness and preload of the spring on the spring-loaded means, and d) the frictional characteristics of the relative movement of the actuator rod and the spring-loaded means. The width of the grooves is hereinafter assumed in all cases to permit the spring-loaded means to bear on only one conical side of a groove at a time.

By varying the controlling characteristics for the movement of the spring-loaded means out of a groove, the amount of axial actuator force required to cause the spring-loaded means to exit the actuator rod groove is controlled. For example, with all other factors remaining constant, use of a stiffer spring preload on the spring-loaded means would necessitate more force to exit from the groove. Each grooved detent can be selectively configured to coact with the spring-loaded actuator in order to give a predictable axial force for disengagement. Using such an approach, the actuator rod can be biased in a controlled manner for movements between its two extreme positions (corresponding to open and closed positions of the valve).

Due to variations in fabrication tolerances and the need for varying adjustments to the detenting and biasing forces, certain types of actuators may at times be configured to "overtravel." A means of dealing with such actuator overtravel is needed so that the actuator will always deliver a specific amount of actuation motion to the valve sealing element. Such overtravel means for actuator overtravel is discussed in Example 13.

EXAMPLE 1

A Dual Snap Action Means Having a Spring-Pin Bias

Figure 1B:
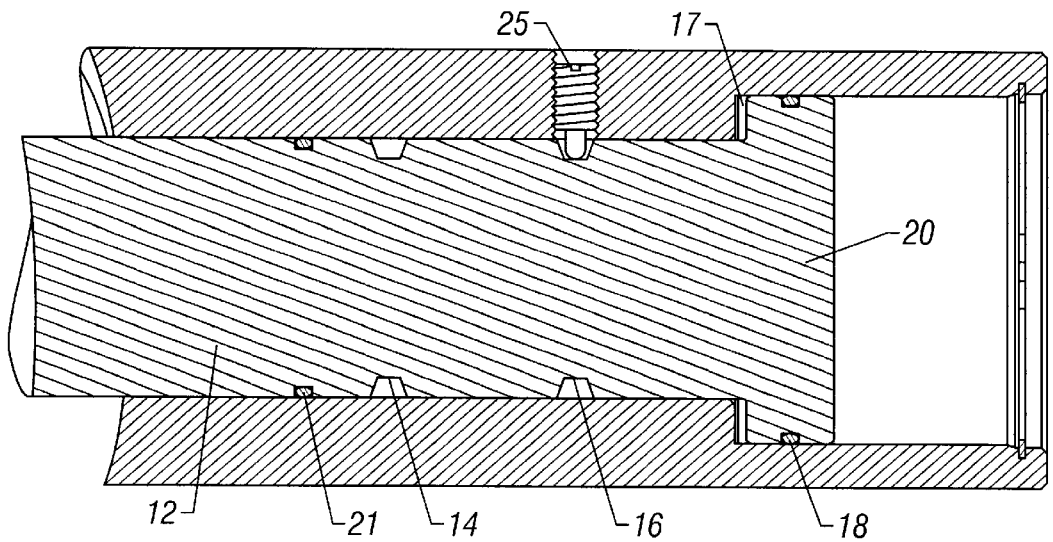
FIG. 1B corresponds to FIG. 1A, but with the valve closed and showing the spring pin engaged in the other detent.

FIGS. 1A and 1B show a longitudinal section of a reciprocating cylindrical actuator 12 housed within a valve body 11 in a first and second position respectively. For clarity, up is used to refer to the side to which external pressure is applied, such as the inlet side of the valve from a pump and is shown on the right hand side of the drawings. For FIGS. 1A and 4B, the valve attached to the actuator is not shown.

Figure 4A:
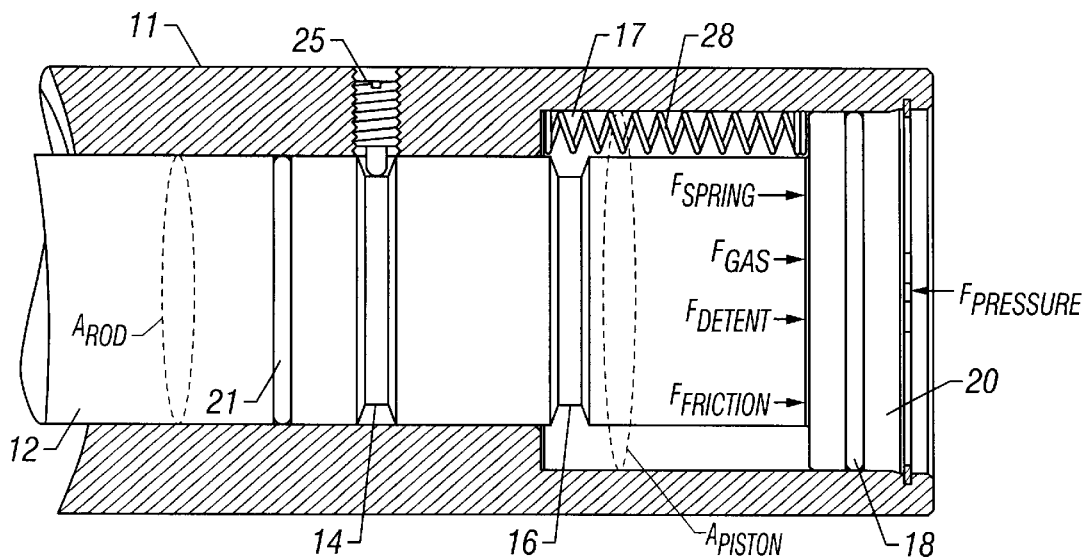
FIG. 4A is a longitudinal sectional view of the actuator of FIG. 1A showing the forces involved in moving the piston to close the valve.
Figure 4B:
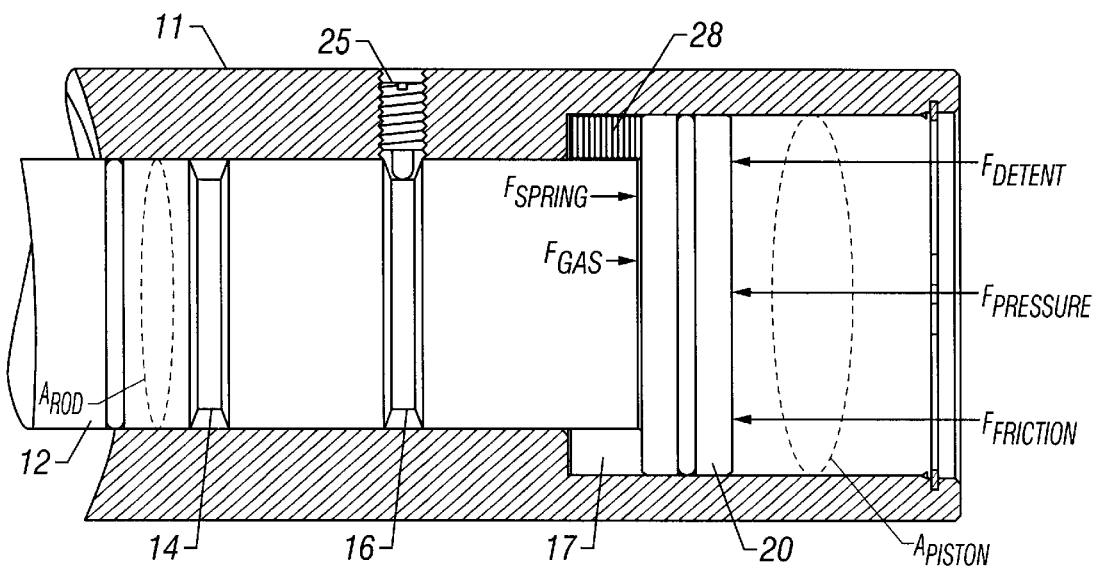
FIG. 4B is a longitudinal sectional view of the actuator of FIG. 1B showing the forces involved in moving the piston to open the valve.

The body 11 has a first cylindrical counterbore 13 on its upper end, an adjoining and somewhat smaller diameter cylindrical counterbore, and a transverse shoulder 19 positioned therebetween. The actuator 12 has a piston head 20 at its upper end that is exposed to pump or other controlling external pressure, such as a selectably applied control fluid pressure. There are two annular grooves or detents positioned axially along the actuator 12 and spaced to reflect the distance of the actuator stroke. The first groove 16 is located closer to the piston head 20 than the second groove 14. The space between piston head 20 and shoulder 19 defines a chamber 17 which may contain one or more bias springs and/or a gas precharge for providing biases to piston head 20. If a gas precharge is used, chamber 17 functions passively as an accumulator. These biasing factors are indicated in FIGS. 4A and 4B. Alternatively, selectably applied fluid pressure may be introduced into chamber 17 for direct control of the pressure force on the lower end of the actuator.

The piston head moves within the first cylindrical counterbore 13 as the valve opens and closes. The actuator rod 12 is sealed against the interior surface of the body 11 with O-ring 18 (on the piston head 20) and O-ring 21 (located lower on the actuator rod 12 than groove 14).

One or more drilled and tapped holes 22, all located in the same plane transverse to the axis of actuator 12 and perpendicular to the longitudinal axis of the actuator 12, are located in the smaller diameter cylindrical section of body 11. One or more commercially available threaded-body ball plungers or spring-pins 25, such as those shown in the Carr Lane Manufacturing Co. 1998 Catalog Component Parts of Jigs and Fixtures as items CL-70-SPS-1 or CL-70-SBP-3, are mounted in tapped holes 22 in order to engage either groove 14 or groove 16.

Figure 2:
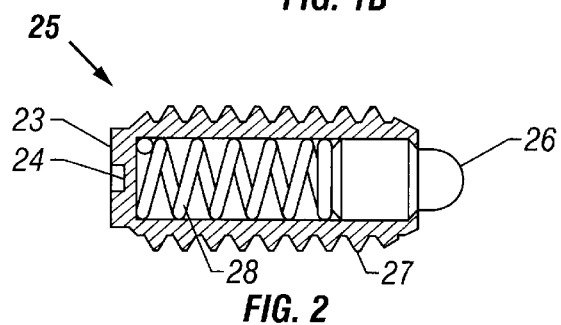
FIG. 2 shows a longitudinal section of the spring pin of FIGS. 1A and 1B.
Figure 3A:
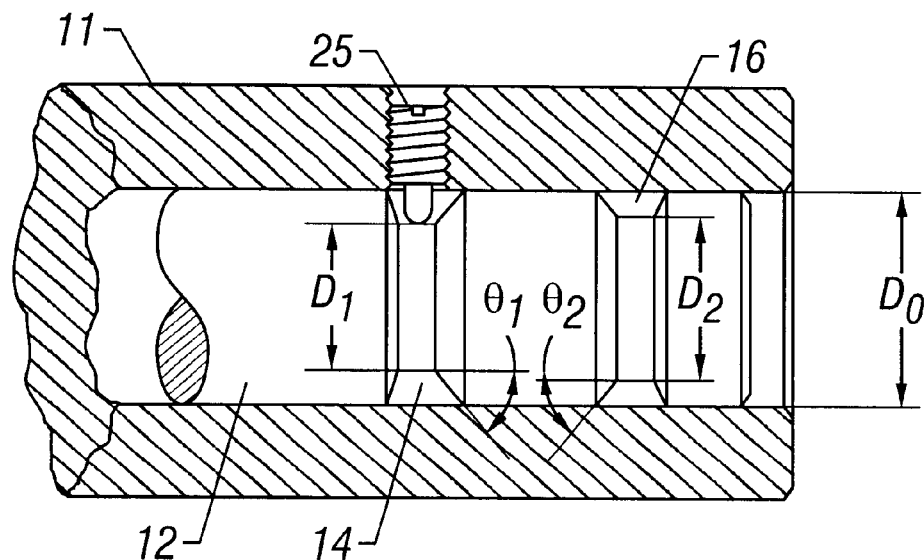
FIG. 3A is a longitudinal sectional view of the actuator rod of FIG. 1A showing the detent angles and depths.
Figure 3B:
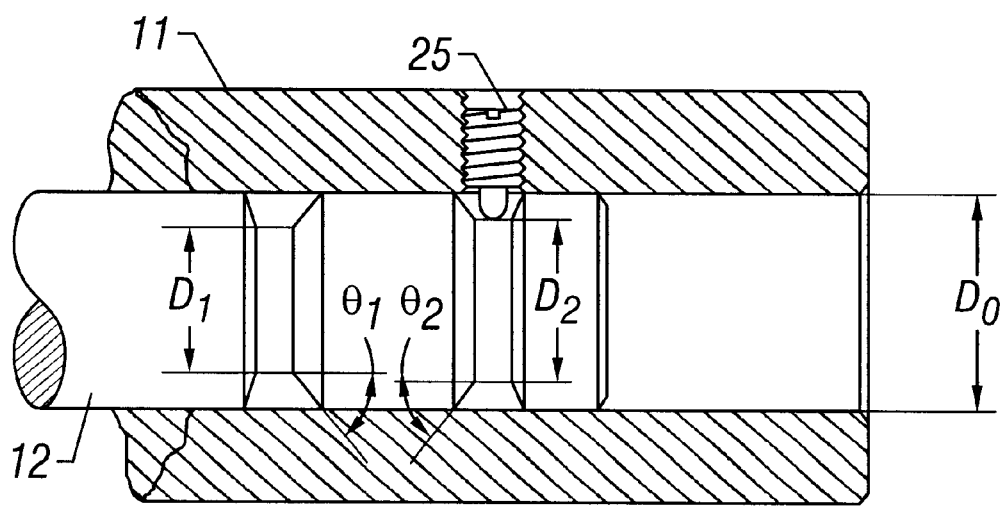
FIG. 3B is a longitudinal sectional view of the actuator rod of FIG. 1B showing the detent angles and depths.

FIG. 2 is a longitudinal section of the spring-pin 25. The spring-pin 25 has an annular externally threaded body 27 with a top end 23 that has a slot 24 that can be used for engagement by a screwdriver to assist in the installation of the spring-pin or in its adjustment. Spring-pin 25 has a central bore that houses a coil spring 28 between the top end 23 and the reciprocating plunger 26 with a ball nose. Coil spring 28 biases the plunger 26 outward to engage the grooves. When force is applied to the outside end of the plunger 26 that exceeds the biasing of the coil spring 28, the plunger 26 will retract inward.

The choice of the spring pin and the groove geometry are made to ensure the following behavior. When the actuator is in the first position, the spring-pin 25 interacts with groove 14 on the actuator 12 and the valve is open. The interaction of the spring-pin 25 with the groove 14 provides a force that resists movement of the actuator from the first position to the second position for the closing of the valve. Once this spring pin force and any other resisting forces are overcome by pressure applied to the upper surface of the piston head 20, the substantially constant unbalanced pressure force is sufficient to cause movement fully to the second position.

The force required for spring-pin 25 to escape the groove is dependent upon the escape ramp angle θ, the depth of the groove, the biasing force of the spring-pin, and friction. For a spring-loaded pin, lateral forces on the pin also enter into the determination of the escape force. With friction predetermined, the detent force (the force necessary to escape from the groove) is dependent upon the configuration of the groove and is selectably determined during fabrication. The spring-pin biasing force can also be adjusted according to the total pressure that the operator desires for actuator resistance. For example, it is a simple procedure to remove the spring-pin 25 and replace it with another spring-pin 25 having a different biasing force.

Turning now to FIGS. 3A, 3B, 4A and 4B, $D_0$ is the diameter of the actuator 12, $D_1$ is the diameter of groove 14, $D_2$ is the diameter of groove 16, $\theta_1$ is the ramp angle for groove 14 and $\theta_2$ is the ramp angle for groove 16. In predetermining the exit force for groove 14, one must consider the depth of groove 14 ($D_0$–$D_1$) and ramp angle $\theta_1$ for groove 14. Similarly, in predetermining the exit force for groove 16, one must consider the depth of groove 16 ($D_0$–$D_2$) and ramp angle $\theta_2$ for groove 16. A predetermined value for each of these variables will then be incorporated into the manufactured actuator 12. Under most circumstances $D_1$ and $D_2$ will be equal, while the ramp angles $\theta_1$ and $\theta_2$ will be different. The ramp angles opposed to $\theta_1$ and $\theta_2$ will typically be greater than angles $\theta_1$ and $\theta_2$ to discourage overtravel of the actuator 12 when moving between its first and second positions.

The excess pressure required on the upper face of piston head 20 to initiate the axial movement of the actuator 12 is strictly due to the snap through action obtained from the resistance of the spring-pin 25. The spring-pin resistance drops to a negligible value after the pin escapes from the groove. Excess pressure is necessary to overcome the increase of force from compression of spring 28 and from compression of any gas precharge, but once the spring 28 is compressed and the spring-pin leaves the groove the pressure applied is sufficient to move the actuator 12 to its other position. Once the actuator 12 is moved to its second position to close the valve, the spring-pin 25 engages groove 16.

In FIGS. 4A and 4B, an optional bias spring is included to illustrate how an auxiliary bias may be applied to the lower face of the piston. The spring is not shown for most of the other embodiments, but could be optionally incorporated in them as well. Similarly, chamber 17 can be precharged with a compressible gas to provide a pressure bias to the lower face of the piston head.

Area $A_{ROD}$, as shown in FIG. 4A, is the traverse cross-sectional area of the actuator rod 12, whereas area $A_{PISTON}$ is the transverse cross-sectional area of the piston head 20. The net piston area is $A=A_{PISTON}-A_{ROD}$. In FIG. 4A the valve is shown in its open position. In the following discussion, P indicates pressure and F indicates a force. The forces biasing the valve open and applied to A are the spring bias ($F_{SPRING}$), the gas or other pressure force applied from below ($F_{GAS}=P_{GAS}\times A$), the detenting force ($F_{DETENT}$), and total friction including the valve ($F_{FRICTION}$). The pressure force ($F_{PRESSURE}$) from above is from the pressure applied to $A_{PISTON}$. Only when the perturbing force $F_{PRESSURE}$ applied to the $A_{PISTON}$ exceeds the resistive forces applied ($F_{SPRING}$, $F_{GAS}$, $F_{DETENT}$ and $F_{FRICTION}$) will the actuator move to its second position and the valve close.

FIG. 4B illustrates the forces involved in opening the valve when the actuator is in its second position and the valve is closed. The forces applied to A from below that promote the opening of the valve are the spring bias ($F_{SPRING}$) and the gas or other pressure force applied from below ($F_{GAS}$). The pressure from above ($F_{PRESSURE}$), total friction ($F_{FRICTION}$), and the detenting force ($F_{DETENT}$) are applied to A from above. Only when the perturbing forces ($F_{GAS}$, $F_{SPRING}$) applied to A exceed the resistive forces applied ($F_{PRESSURE}$, $F_{FRICTION}$, $F_{DETENT}$) will the actuator move to its first position and the valve open.

EXAMPLE 2

Application of a Dual Snap Action Means to a Poppet Valve

FIGS. 5A and 5B illustrate the application of the dual snap action actuator described in Example 1 to a poppet valve in its open and closed positions. The poppet valve 30 shown in FIGS. 5A and 5B is a standard double poppet valve.

In FIG. 5A, the poppet valve is in a first position where fluid entering port 35 will exit port 37 because first poppet face 31 has sealed the entrance to port 38 by biasing against a first seat 29. Whenever the pressure force applied to the upper end of the piston head 20 through port 32 exceeds the pressure force applied to the lower side of piston head 20 through port 34, plus any spring bias, detenting force, other pressure forces in the valve, and friction, the actuator 12 will move to its second position.

FIG. 5B shows the poppet valve in its second position where fluid entering port 35 will exit port 38 because second poppet face 33 has sealed the entrance to port 37 by biasing against a second seat 36. Whenever the pressure force plus any spring bias is applied to the lower end of the piston head 20 through port 34 exceeds the gas pressure force on the upper end of piston head 20, plus any valve pressure forces, detenting force and friction, the actuator 12 will move to its first position shown in FIG. 5A.

A variety of bi-stable dual snap action mechanisms can be equally applied to the poppet valve illustrated in FIGS. 5A and 5B, although the spring-pin mechanism is the example shown.

EXAMPLE 3

Application of a Dual Snap Action Means to a Spool Valve

Figures 6A, 6B:
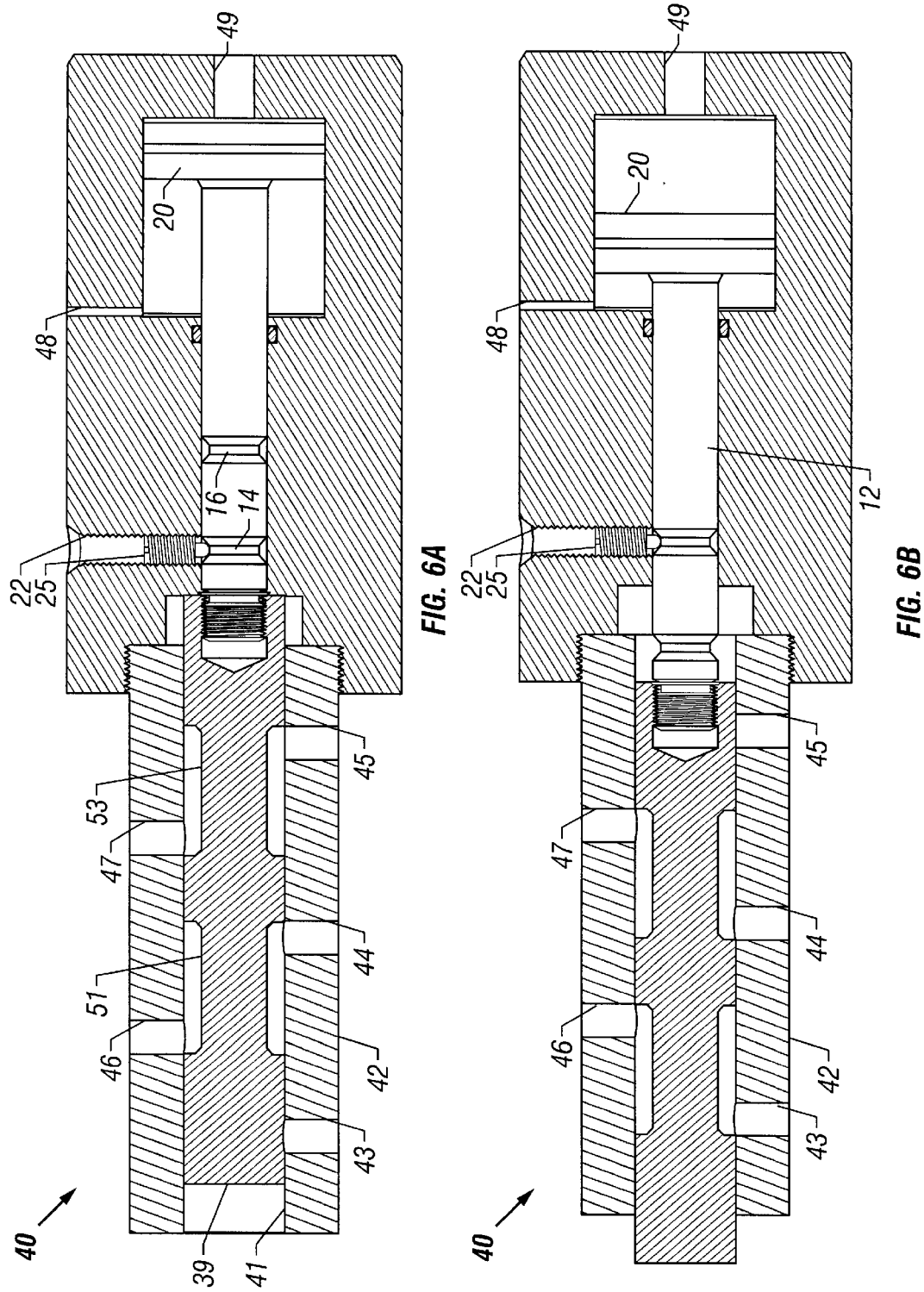
FIG. 6A is a longitudinal sectional view of a spool valve with dual snap action in a first position.
FIG. 6B is a longitudinal sectional view of a spool valve with dual snap action in a second position.

FIGS. 6A and 6B illustrate the application of the dual snap action actuator described in Example 1 to a spool valve 40 in its first and second positions. The spool valve 40 shown in FIGS. 6A and 6B is a standard spool valve with annular flow grooves on a rod. The spool is pressure balanced.

In FIG. 6A, the spool 39 is in a first position in the spool housing 42 such that fluid entering inlet port 44 will circulate around a first annular spool groove 51 to exit outlet port 46 and fluid entering return port 47 will circulate around a second annular spool groove 53 to exit outlet port 45. Whenever the pressure applied to the upper end of the piston head 20 through port 49 exceeds the pressure applied to the lower face of piston head 20, plus any spring bias, the detenting force and friction, the actuator 12 will move to its second position causing the spool 39 to move within the spool housing bore 41.

In FIG. 6B, the spool 39 is in a second position in the spool housing 42 such that fluid entering inlet port 44 will circulate around second annular spool groove 53 to exit outlet port 47 and fluid entering return port 46 will circulate around first annular spool groove 51 to exit outlet port 43. Whenever the pressure force applied to the lower face of the piston head 20 through port 48 plus any spring force exceeds the pressure force applied to the upper face of piston head 20, plus the detenting force and friction, the actuator 12 and spool 39 will move to their first positions shown in FIG. 6A.

A variety of bi-stable dual snap action mechanisms can be equally applied to the spool valve illustrated in FIG. 6, although the spring-pin mechanism is the example shown.

EXAMPLE 4

Application of a Dual Snap Action Means to a Gate Valve

FIGS. 7A, 7B, 8A and 8B show the application of the dual snap action actuator described in Example 1 to a gate valve 60 in its open and closed positions. The gate valve 60 shown in FIGS. 7A, 7B, 8A and 8B is a standard gate valve used in the industry.

Figure 7A:
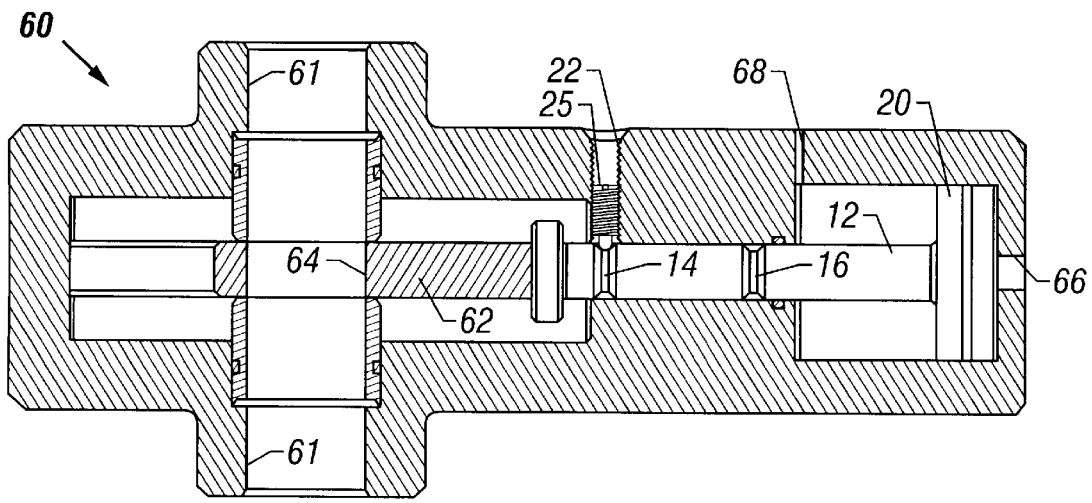
FIG. 7A is a longitudinal sectional view taken through the flow passages of a gate valve with dual snap action with an open gate.

In FIG. 7A, the gate valve 60 is open such that fluid can flow through the gate valve flow passage 61. The gate 62 is in a first position such that the gate through hole 64 is aligned with flow passage 61 and fluid can flow freely through the flow passage 61. If a pressure force is applied to the upper end of the piston head 20 through port 66 that exceeds the pressure force applied to the lower face of piston head 20 through port 68, plus any spring bias, the detenting rod end pressure force, and friction, then actuator 12 will move to its second position causing the gate to move to close off the passage of fluid through flow passage 61 as seen in FIG. 7B.

Figure 7B:
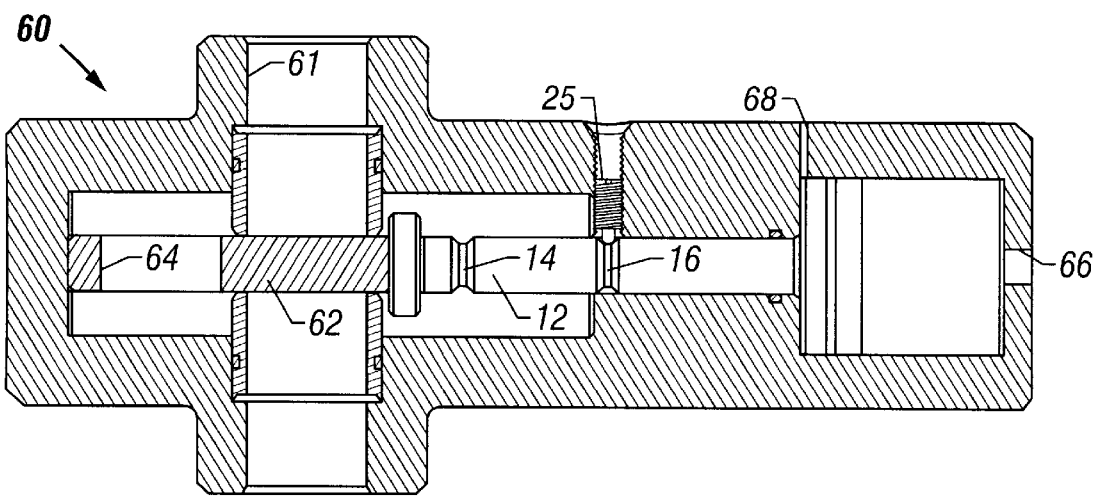
FIG. 7B is a longitudinal sectional taken through the flow passages of a gate valve with dual snap action with a closed gate.

FIG. 7B shows the gate valve 60 closed. The gate 62 is in a second position such that the gate through hole 64 is not aligned with flow passage 61 and fluid cannot flow freely through the flow passage 61. If pressure force applied to the lower end of piston head 20 through port 68 plus any spring bias and rod end pressure force exceeds the pressure force applied to the upper face of piston head 20 through port 66 plus any spring bias, the detenting force, and friction, then actuator 12 will move to its first position causing the gate to move to open flow passage 61 as seen in FIG. 7A.

Figure 8A:
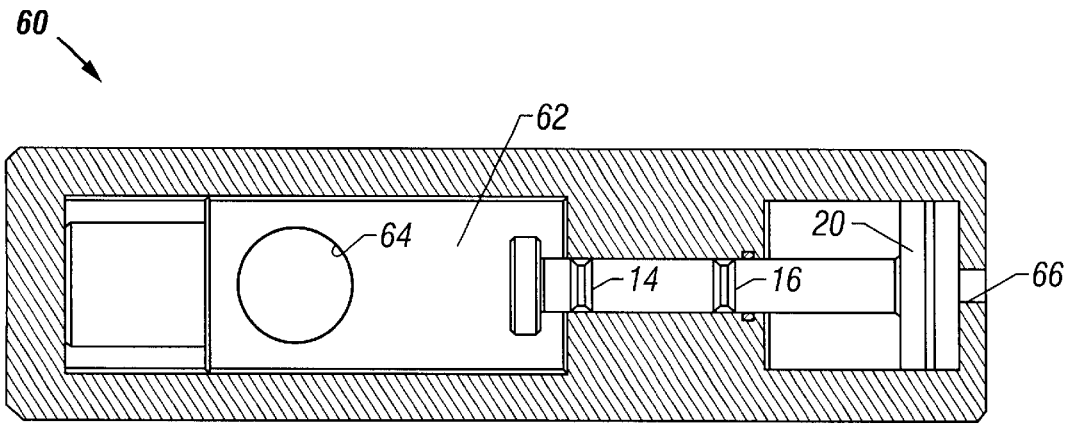
FIG. 8A is a longitudinal sectional taken perpendicular to the flow passages of a gate valve with dual snap action with an open gate.
Figure 8B:
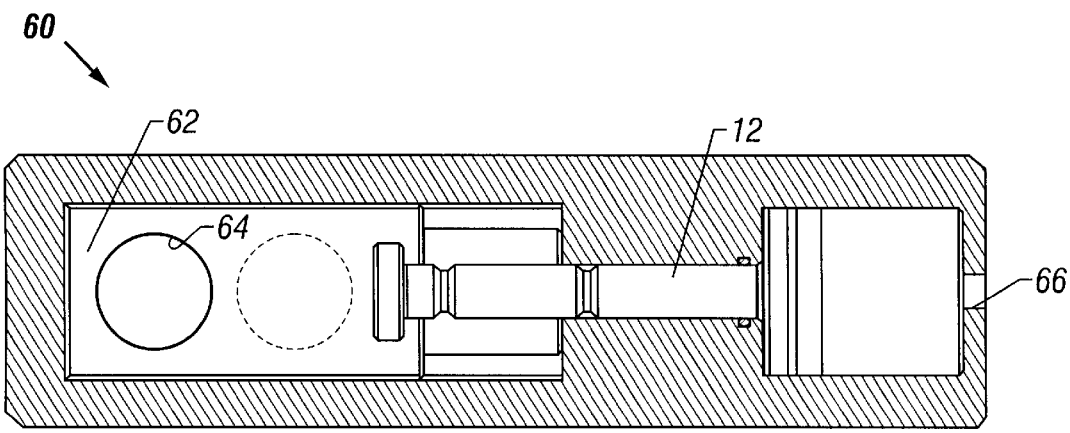
FIG. 8B is a longitudinal sectional taken perpendicular to the flow passages of a gate valve with dual snap action with a closed gate.

FIGS. 8A and 8B are longitudinal sections of the gate valve 60 taken perpendicular to the flow passage. FIG. 8A corresponds to 7A where the gate is open and fluid flows freely through the gate valve flow passage 61. FIG. 8B corresponds to 7B where the gate is closed and fluid cannot flow through flow passage 61.

A variety of bi-stable dual snap action mechanisms can be equally applied to the gate valve illustrated in FIGS. 7 and 8, although the spring-pin mechanism is the example shown.

EXAMPLE 5

A Dual Snap Action Means Having a Garter Spring Bias

Figure 9A:
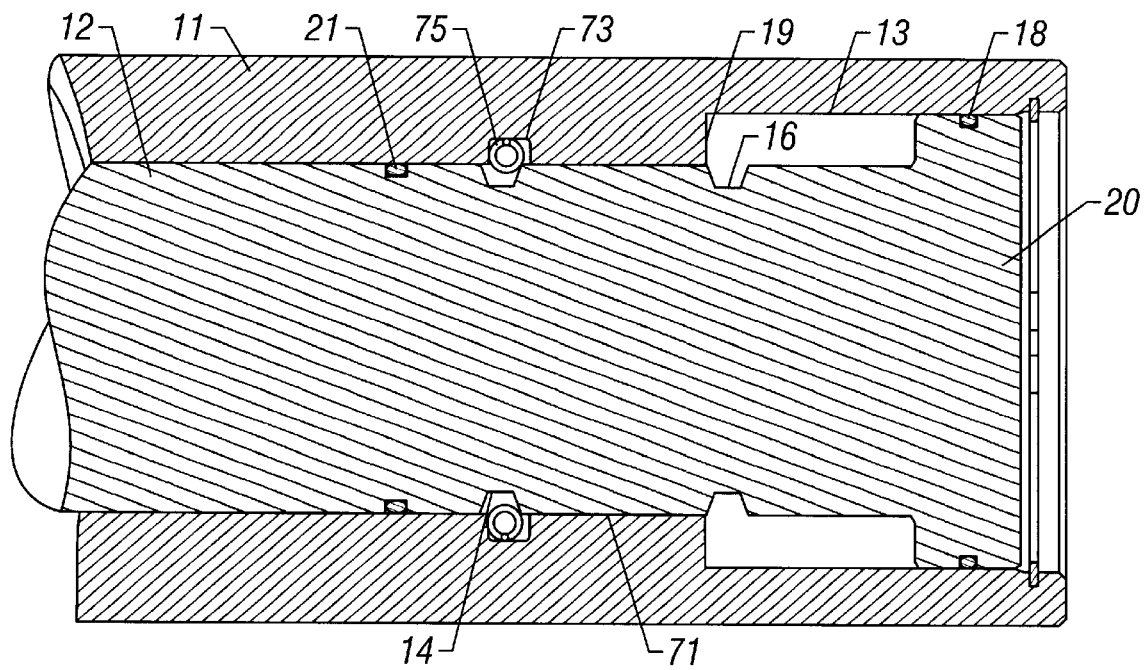
FIG. 9A shows a longitudinal section of an actuator of a valve, where the actuator has two detents and a garter spring providing biasing detenting force is engaged in one detent.
Figure 9B:
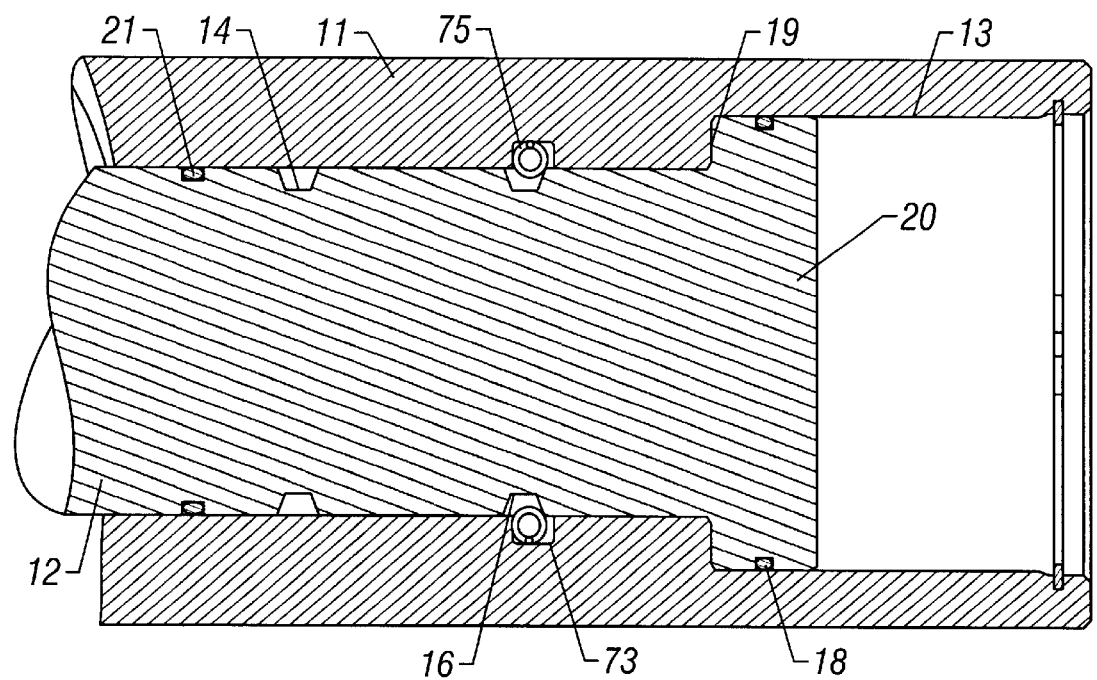
FIG. 9B shows a longitudinal section of the actuator of FIG. 9A when the valve is in the closed position and the garter spring is engaged in the other detent.

FIGS. 9A and 9B show a longitudinal section of a reciprocating cylindrical actuator 12 housed within a valve body 11 in a first and second position respectively. The actuator 12 in this Example 5 is the same as that of Example 1, but the spring bias is different.

The body 11 has a first cylindrical counterbore 13 on its upper end, an adjoining and somewhat smaller diameter cylindrical counterbore 71, and a traverse shoulder 19 positioned therebetween. The actuator 12 has a piston head 20 at its upper end that is exposed to pump or other external pressure. There are two annular grooves positioned axially along the actuator 12 and spaced to reflect the distance of the actuator stroke. The first groove 16 is located closer to the piston head 20 than the second groove 14. Annular chamber 17 is located between shoulder 19 and piston head 20. Chamber 17 may contain one or more springs and/or a gas precharge to bias against the lower side of piston head 20. These biasing means in chamber 17 are not shown here.

The piston head moves within the first cylindrical counterbore 13 as the valve opens and closes. The actuator rod 12 is sealed against the interior surface of the body 11 with O-ring 18 (on the piston head 20) and O-ring 21 (located lower on the actuator rod 12 than groove 14).

The interior surface of smaller diameter cylindrical counterbore 71 has an annular groove 73. Housed within the groove 73 is a garter spring 75. Several different types of spring coil may be applicable for this mechanism. For example, the catalog No. 3.1 E of the Bal Seal Engineering Company, Inc., Santa Ana, Calif., discusses several types which could be satisfactory. In some cases, helical springs could also suffice. Garter spring 75 has a diameter that is greater than the depth of the groove 73.

Escaping from groove 73 requires that the garter spring 75 be compressed laterally in a radial direction with sufficient force that it will displace enough to clear the detent and the rest of the surface adjacent to the detent, until the garter spring engages the next detent.

Figure 10A:
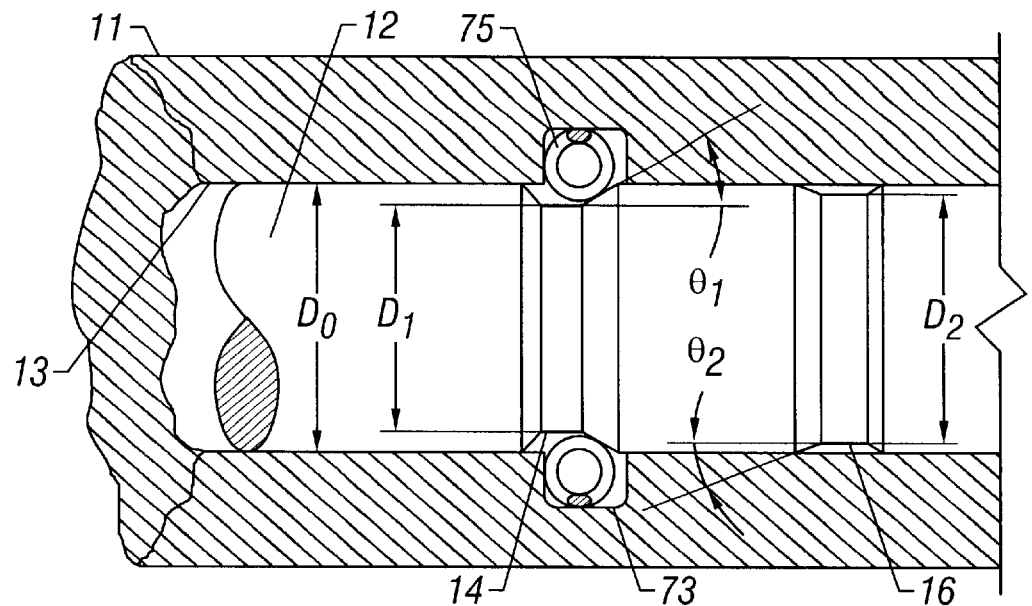
FIG. 10A is a longitudinal sectional view of the actuator of FIG. 9A showing the detent angles and depths.
Figure 10B:
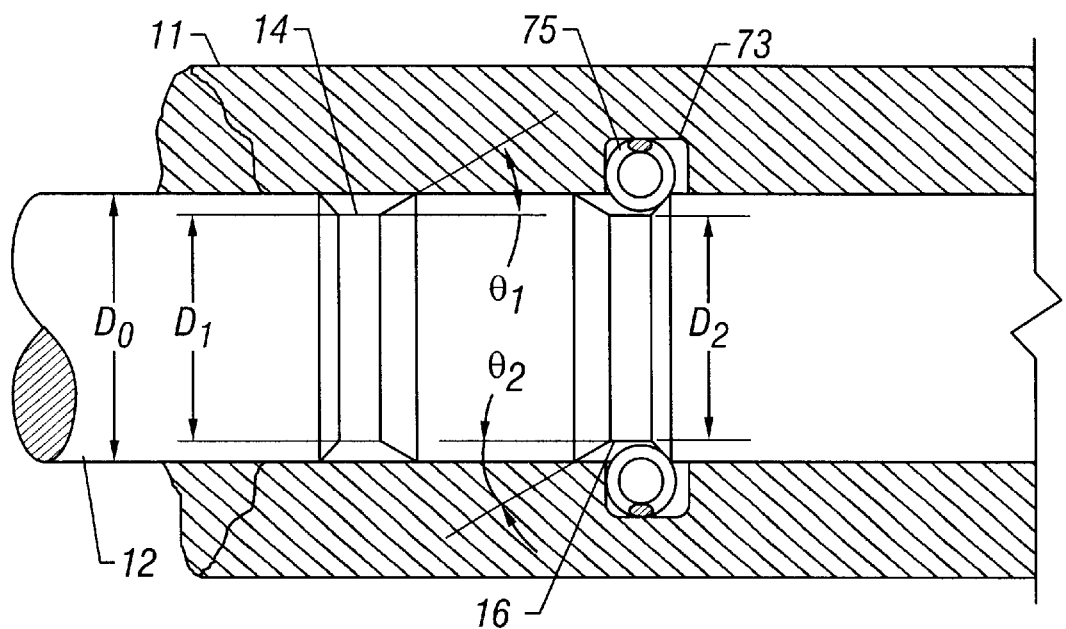
FIG. 10B is a longitudinal sectional view of the actuator of FIG. 9B showing the detent angles and depths.

Turning now to FIGS. 10A and 10B, $D_0$ is the diameter of the actuator 12, $D_1$ is the diameter of groove 14, $D_2$ is the diameter of groove 16, $\theta_1$ is the ramp angle for groove 14 and $\theta_2$ is the ramp angle for groove 16. In predetermining the exit force for groove 14, one must consider the depth of groove 14 ($D_0-D_1$) and ramp angle $\theta_1$ for groove 14. Similarly, in predetermining the exit force for groove 16, one must consider the depth of groove 16 ($D_0-D_2$) and ramp angle $\theta_2$ for groove 16. A predetermined value for each of these variables will then be incorporated into the manufactured actuator 12. Under most circumstance $D_1$ and $D_2$ will be equal, while ramp angles $\theta_1$ and $\theta_2$ are not equal. The ramp angles opposed to $\theta_1$ and $\theta_2$ will typically be greater than angles $\theta_1$ and $\theta_2$ to discourage overtravel of the actuator 12 when moving between its first and second positions.

The force required for a garter spring to escape the groove is dependent upon the escape ramp angle $\theta_1$ or $\theta_2$, the spring resistance to compression, any spring tensile preload, and friction. For a grooved detent in a cylindrical rod, a toroidal spring arrangement is used and the compressive forces have axial and radial components. For a detent in a flat face, the compressive forces have tangential and normal to the flat face components. In both cases, the garter spring reacts against the detent ramp with unit force FG normal to the ramp, experiences a frictional unit force $\mu F_G$ parallel the ramp, and has a mounting groove side unit reaction $F_{DETENT}$ and a compressive reaction $F_C$ normal to the travel direction. Unit force refers to force per unit of length. Using vector analysis, it can be shown that $F_{DETENT} = F_G (\sin\theta + \mu \cos\theta)/(\cos\theta - \mu \sin\theta)$. The force developed by the garter spring in the detent is then $F_{DETENT}$ multiplied by the length of the garter spring. When the garter spring is crossing the transition ridge between the escape ramp of the detent and the surface adjacent the detent, the effective angle of the detent is reduced to between $\theta$ and 0, while the force $F_c$ is increased.

When the actuator is in the first position, the garter spring 75 interacts with groove 14 on the actuator 12 and the valve is open. The interaction of the garter spring 75 with the groove 14 provides forces that resist movement of the actuator from the first position to the second position and the closing of the valve. Once these resisting forces are overcome by pressure forces applied to the upper surface of the piston head 20, the unbalanced pressure force is sufficient to cause movement fully to the second position.

The excess pressure required to initiate the axial movement of the actuator 12 is strictly due to the snap through action obtained from the resistance of the garter spring 75. Excess pressure force is necessary to overcome the increase of force as the garter spring 75 compresses. Once the garter spring 75 is compressed and the spring leaves the groove, the spring resistance drops to a negligible value and the pressure applied is sufficient to move the actuator 12 fully to its other position. Once the actuator 12 is moved to its second position to close the valve, the garter spring 75 is engaged in groove 16. Opening of the valve from the closed position shown in FIG. 10B proceeds in a similar manner, but with the force magnitudes different and the friction resistance reversed.

EXAMPLE 6

A Dual Snap Action Means Having a Magnetic Bias

Figure 11A:
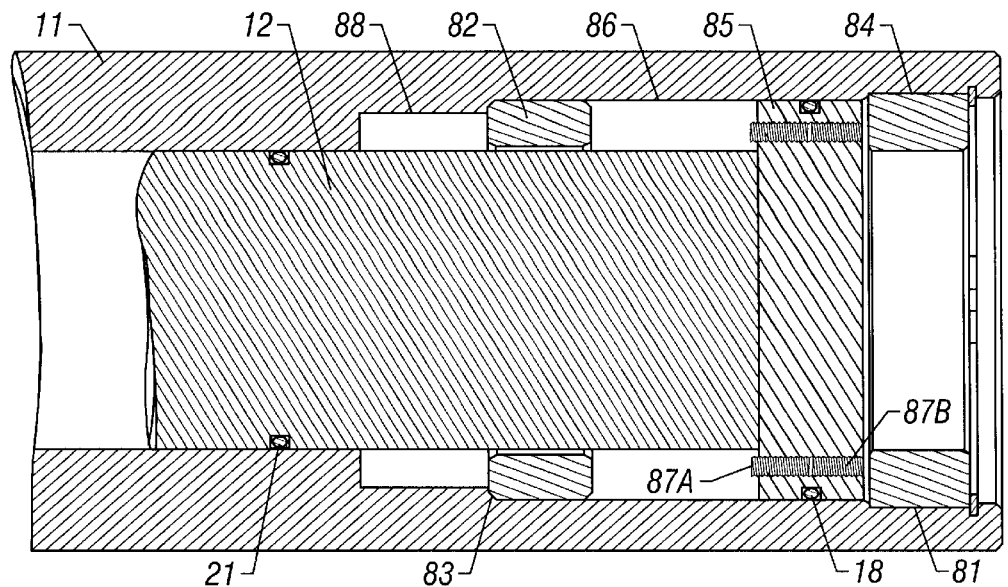
FIG. 11A shows a longitudinal section of an actuator of an open valve, where the actuator has an end piece made of a magnetic material attracted to a first magnet when the valve is in an open position.
Figure 11B:
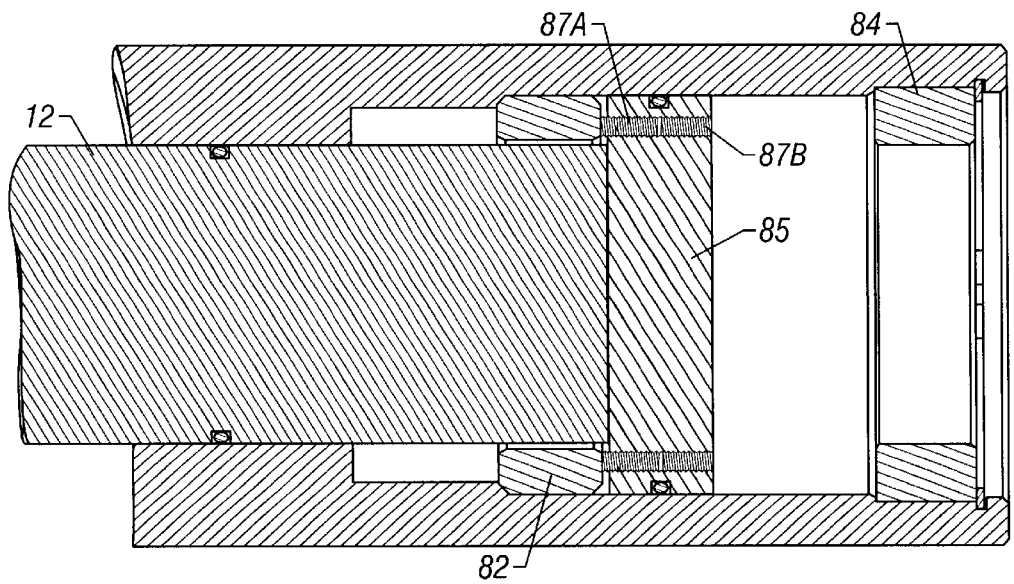
FIG. 11B shows a longitudinal section of the actuator of FIG. 11A where the magnetic material is attracted to a second magnet when the valve is in the closed position.

FIGS. 11A and 11B show longitudinal sections of a magnetically biased reciprocating cylindrical actuator 12 housed within a valve body 11 in a first and second position respectively.

A magnet with its poles oriented to attract a piece of magnetic material exhibits an attractive force which is increasing with approach to that piece; the converse is true for increasing separation. This relatively rapid loss of attractive force with increasing separation distance or gain of attractive force with decreasing separation is well suited to providing snap-action behavior.

The body 11 has a first cylindrical counterbore 81 on its upper end, a second adjoining and somewhat smaller diameter cylindrical counterbore 86, third counterbore 88, and a conical chamfer 83 positioned at the lower end of counterbore 86. The actuator 12 has a piston head 85 at its upper end connected by fasteners or welding or other suitable means. The piston head 85 is a magnet that is exposed to pump or other external pressure forces. There are two annular rings 82 and 84 made of magnetic material that are positioned axially along the actuator 12 and spaced to reflect the distance of the actuator stroke. The first annular ring 84 is located at the upper end of the body 11 and closely fits within the first counterbore 81. The second annular ring 82 is located at the lower end of the second counterbore 86 and engages the conical chamfer 83 on the lower end of annular ring 82. The annular space between piston head 85 and the lower end of the third counterbore 88 can be used to house biasing springs and precharged gas to upwardly bias the lower face of piston head 85. These biasing means are not shown in FIGS. 11A or 11B. Likewise selectably applied fluid pressure could be used to act on the lower face of piston head 85 for active control.

As the valve opens and closes, the piston head 85 reciprocably moves within the second cylindrical counterbore 86 to interact strongly with either the first annular ring 84 or the second annular ring 82. The actuator rod 12 is sealed against the interior surface of the body 11 with O-ring 18 (on the piston head 85) and O-ring 21 (located lower on the actuator rod 12 below the second annular ring 82).

The magnetic piston head 85 is shown with two pairs of threaded spacer rods 87 that are threaded into the piston head so that they may be extended from either transverse face. These threaded rods 87A,B are used to adjust the minimum approach distance between the piston head 85 and the annular rings 82 and 84 at the ends of the piston stroke. As the rods 87A,B are screwed out of the piston head 85, the distance between the piston head 85 and the annular ring 82 or 84 during their engagement is increased, which decreases the force necessary for the piston head to escape its interaction with that annular ring. For each pair of rods 87A,B, the two rods 87A,B are threaded into the piston head 85 on opposite sides of the piston head 85. Thus, rod 87A can be used to adjust the interaction of the piston head 85 with the first annular ring 84 and an opposed rod 87B can be used to adjust the interaction of the piston head 85 with the second annular ring 82.

When the actuator is in the first position, the piston head 85 interacts with and is attracted to the first annular ring 84 and the valve is open. The interaction of the magnetic piston head 85 with the magnetic material of the first annular ring 84 provides forces that resist movement of the actuator from the first position to the second position for the closing of the valve. Once these resisting forces are overcome by pressure forces applied to the upper surface of the piston head 85, the unbalanced pressure force is sufficient to cause movement fully to the second position.

The excess pressure required to initiate the axial movement of the actuator 12 is strictly due to the snap through action obtained from the attraction of the magnetic piston head 85 to the annular rings 82 and 84. Excess pressure is necessary to overcome this attractive force, but once sufficient force is present to separate the piston head 85 from the first annular ring 84, the attractive force between the piston head 85 and the annular ring 84 rapidly diminishes so that the pressure force applied is sufficient to move the actuator 12 to its second position. As the actuator 12 is moved close to its second position, the attractive force between the magnetic piston head 85 and the other annular ring 82 pulls them together to close the valve and detent the piston head 85 against the ring 82.

EXAMPLE 7

A Dual Snap Action Means Having a Canted Spring Bias

Figure 12A:
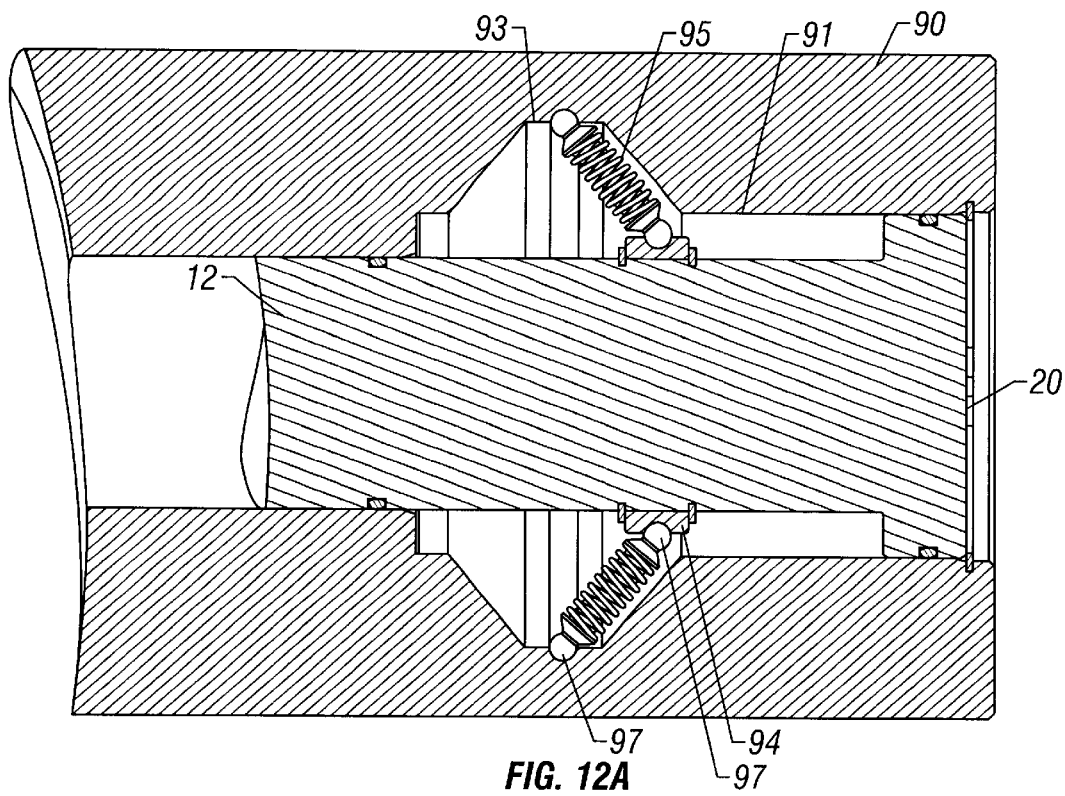
FIG. 12A shows a longitudinal section of an actuator of an open valve, where the actuator is attached to a canted biasing spring and in a first position.
Figure 12B:
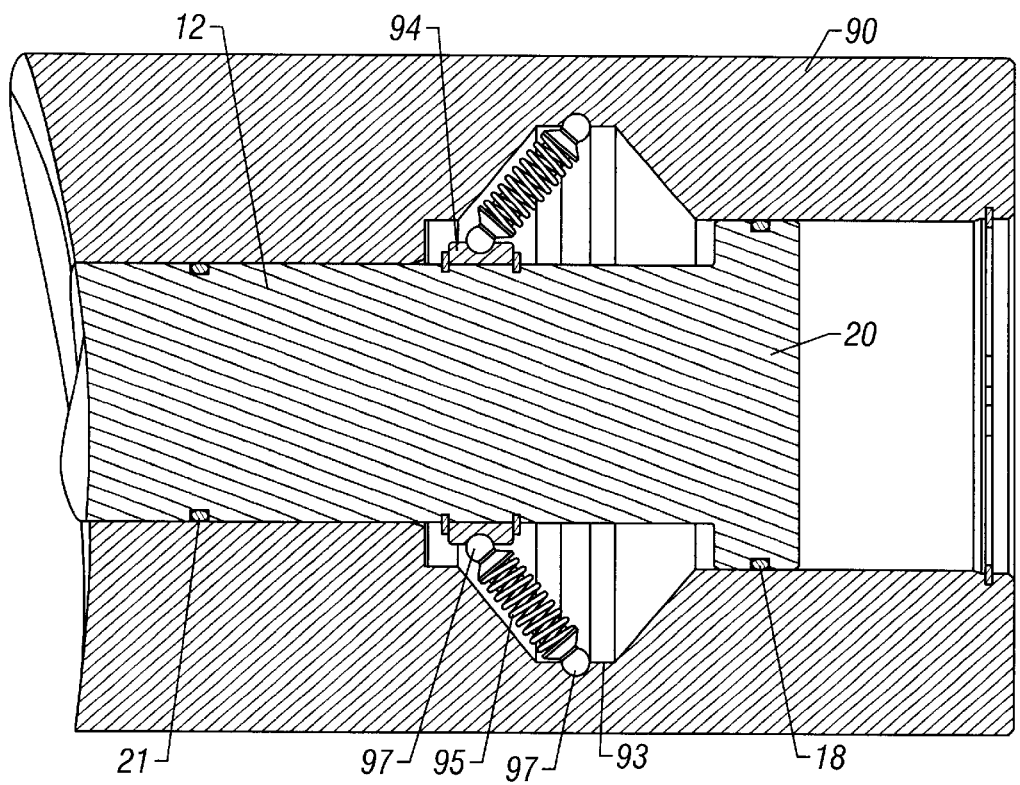
FIG. 12B shows a longitudinal section of the actuator of FIG. 12A when the valve is in the closed position and the actuator is in its second position.

One dual snap action valve embodiment uses a canted spring bias on the actuator to control movement between the open and closed positions. FIGS. 12A and 12B illustrate the application of the canted spring on a reciprocating cylindrical actuator 12 housed within a valve body 90 in a first and second position respectively.

The body 90 has a first cylindrical counterbore 91 on its upper end and a large adjoining groove 93. One or more compression springs 95 are attached at one end to an actuator spring anchor 94 and at the other end to the top side of the groove 93. Each end of compression spring 95 is pivotally secured by spring end swivel 97.

The actuator 12 has a piston head 20 at its upper end that is exposed to pump or other external pressure forces. The piston head 20 reciprocably moves within the first cylindrical counterbore 91 as the valve opens and closes. The actuator rod 12 is sealed against the interior surface of the body 91 with O-ring 18 (on the piston head 20) and O-ring 21 (located lower on the actuator rod 12 than the actuator spring anchor 94). The annular volume between piston head 20 and the lower end of groove 93 can serve as a chamber for precharged gas to bias piston head 20 upwardly, or alternatively selectably applicable fluid pressure can be introduced there for active control.

Figure 12C:
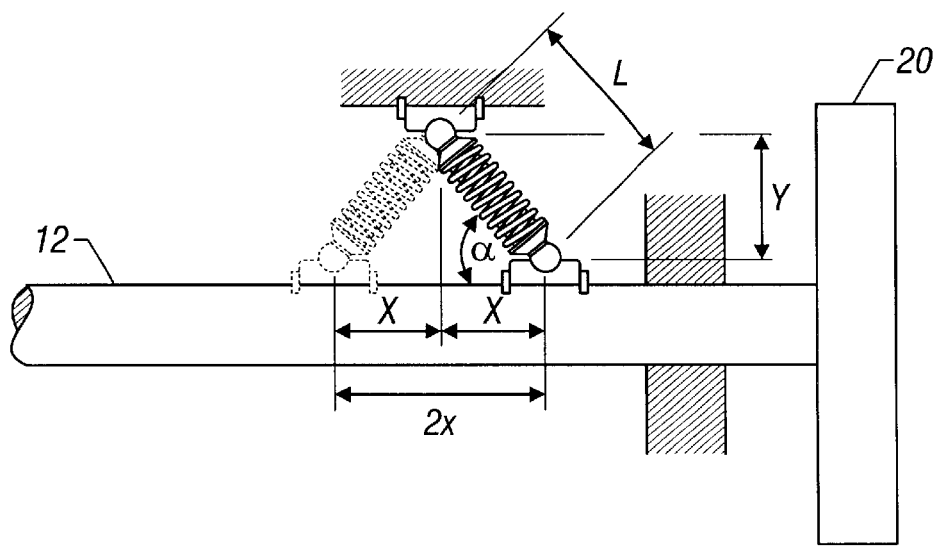
FIG. 12C is a schematic illustration of a canted spring in its first and second positions.

This canted spring actuator provides a travel control means in both valve opening and closing positions as illustrated in FIG. 12C. For this case, the travel end stops are assumed to be on the valve operated by the actuator. A biasing force is applied to the reciprocating actuator rod 12 by means of compression springs 95 pivotally anchored to spring anchor 94 on the actuator 12, and inclined at an angle $\alpha$ to the rod axis. The biasing force opposes movement of the actuator away from its stop. The magnitude of the biasing force F is given by $F = k (L_0 - L) \cos \alpha$, where k is the spring constant, $L_0$ is the unloaded spring length, and L is the loaded spring length. The spring length is given by $L = (x^2 + y^2)^{1/2}$, where y is the radial component of the offset of the spring end from the point of attachment to the spring anchor 94 and x is the axial component of the offset of the end of the spring attached to the top end of groove 93 to the point of actuator attachment. The spring should be configured such that, when the actuator 12 is against its stop, the derivative with respect to x of the spring bias force F is greater than 0. The equivalent expression is $L_0 x y^2 > L^3$. With this condition met, the actuator remains static against its stop until the actuation force exceeds the biasing force F. At that point, the actuator rod snaps to its alternative position. Of course, it is assumed that the actuation force remains substantially constant during the shifting of the valve.

Figure 12D:
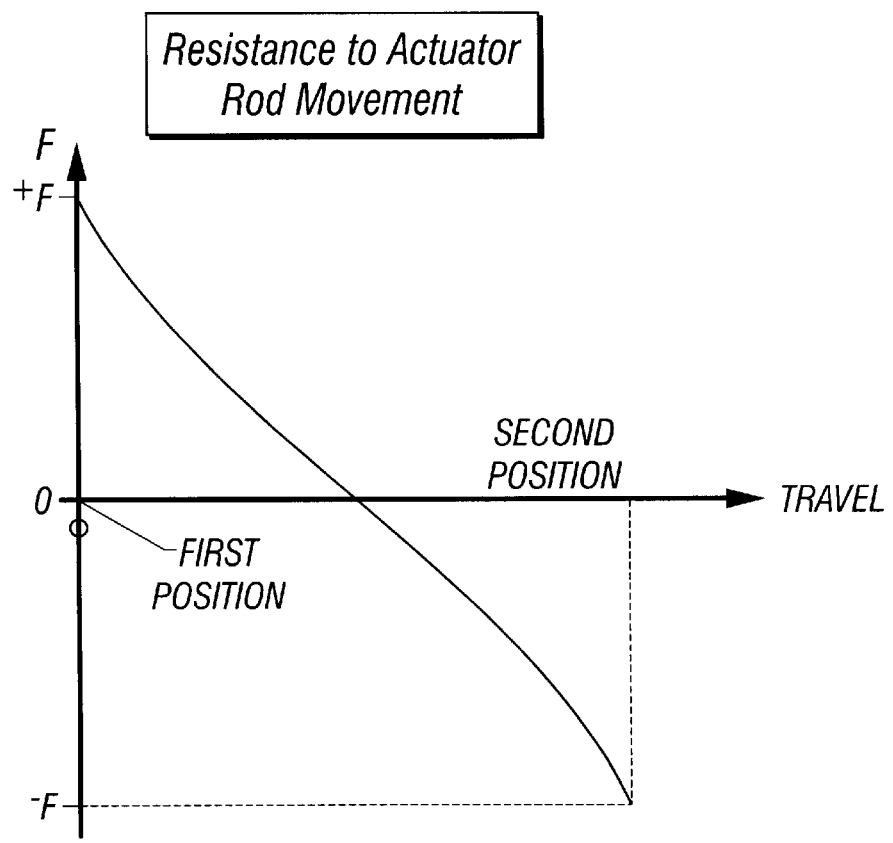
FIG. 12D is a graphical representation of the force versus displacement behavior for actuator rod movement for the mechanism of FIGS. 12A, 12B, and 12C.

As shown in FIG. 12D, the preload force component of the compression spring 95 in the permissible plane of motion is initially resisted by an abutting first travel stop, but when the spring resistance force component in the direction of translation is exceeded by the net actuating force, then the spring 95 will snap through. This snap through will occur with continuing motion as the resistance to motion of the spring 95 is reduced to zero when the spring 95 is perpendicular to the axis of motion and then the spring force component reverses with further motion so that continuing motion is then assisted by the spring. The motion will proceed until either the spring unloads or the moving mechanism encounters a second travel stop resisting motion opposed to that resisted by the first travel stop. If the second travel stop is likewise positioned so that the spring exhibits snap through behavior for travel away from the second stop, then bidirectional snap through behavior is obtained. When applied to a valve, the position of the valve sealing member at one travel stop is closed, while at the other travel stop, the valve is open.

The primary drawback to the application of canted springs for snap-through action in a ball valve is the relatively large radial spatial requirements for housing such an arrangement. The spatial requirements are increased if stronger springs or more travel are required.

Application of Snap Action Means to Rotary Valves

The bi-stable snap action means described above for linearly translating valves are also suitable for rotary valves. Examples 8 and 9 show a ball valve where the detents are on the rotating ball valving element and the spring-loaded means is stationary. A reciprocating tubular actuating rod applies sufficient force from its piston to the ball to overcome the spring-loaded means interacting with the detents and rapidly moves the ball to the next set of detents.

The snap action of the valve is accomplished because the force required to unseat the spring-loaded means from the detents to rotate the ball to the next set of detents exceeds the force required to fully move the ball from one position to the other position (i.e., open or close the valve). This is true because the detent friction force resisting the movement of the ball between detents is almost negligible compared to the forces resisting the movement of the ball when the spring-loaded means is engaged in a detent on the ball. The forces resisting the movement of the ball when the spring-loaded means is engaged in a detent are controlled by: a) the depth of the detent, b) the exit slope of the detent, c) the stiffness and preload of the spring on the spring-loaded means, and d) the frictional characteristics of the actuator and the mechanism of the ball.

Examples 10–12, on the other hand, illustrate rotary ball valves where the snap action means is on the actuator.

EXAMPLE 8

A Ball Valve Having a Spring-Pin Snap Action Means on the Ball

Turning now to FIGS. 13A–18, an example of a rotary valve with a snap action mechanism on the ball or valving element is illustrated. This valve is shown in detail in copending patent application "Mudsaver Valve with Dual Snap Action" that is incorporated herein by reference. Thus, only the bi-stable snap action mechanism applied to the ball and the actuating means for rotating the ball will be discussed below.

Figure 13A:
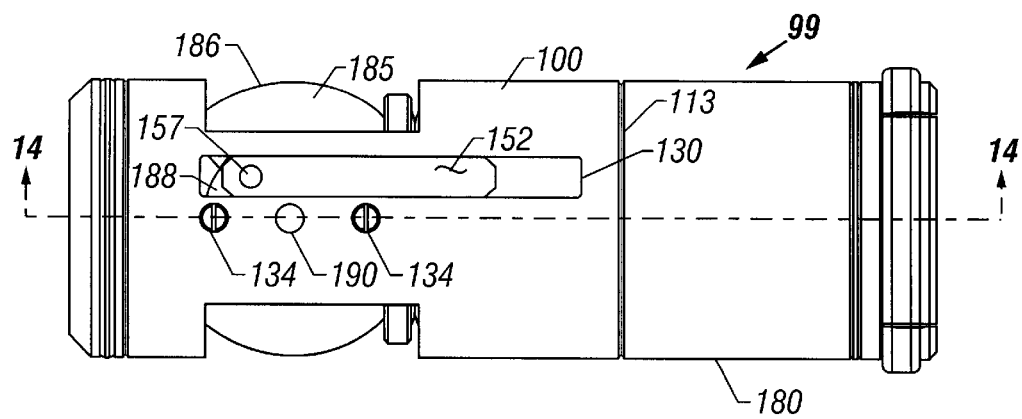
FIG. 13A shows a side view of an open ball valve mechanism configured as a cartridge.
Figure 13B:
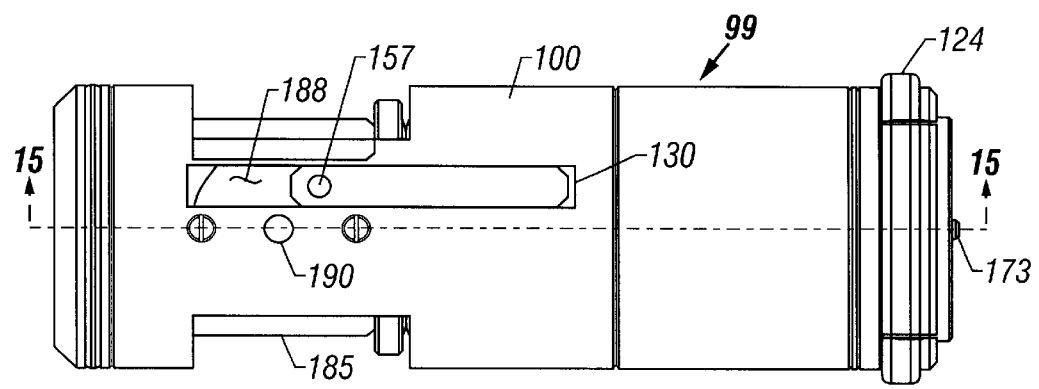
FIG. 13B is a side view of the ball valve of FIG. 13A when the valve is in the closed position.

FIGS. 13A and 13B show the valve 99 assembled as a cartridge in an open and closed position respectively. FIG. 14 is a quarter sectional view of the valve shown in FIG. 13A taken along section line 14—14.

Figure 14A:
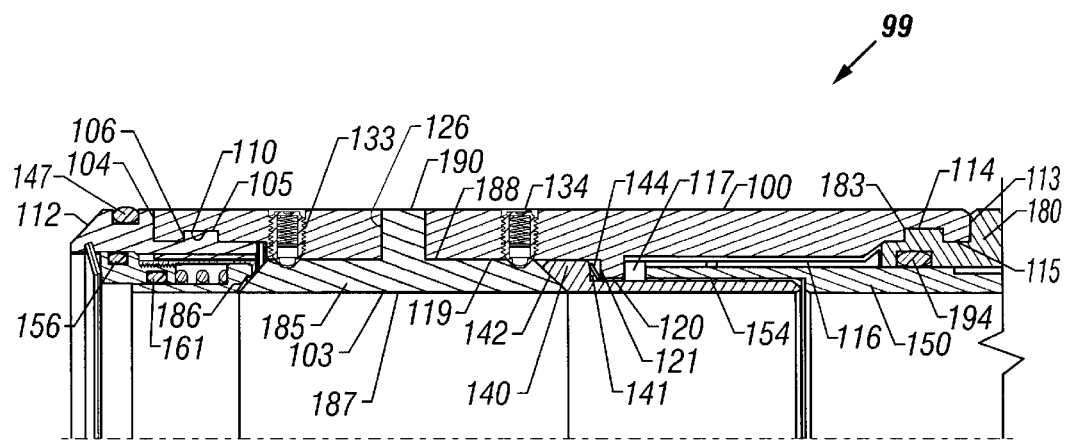
FIG. 14 (broken apart for clarity into FIG. 14A and FIG. 14B) is a longitudinal half section along section line 14—14 of FIG. 13B.
Figure 15:
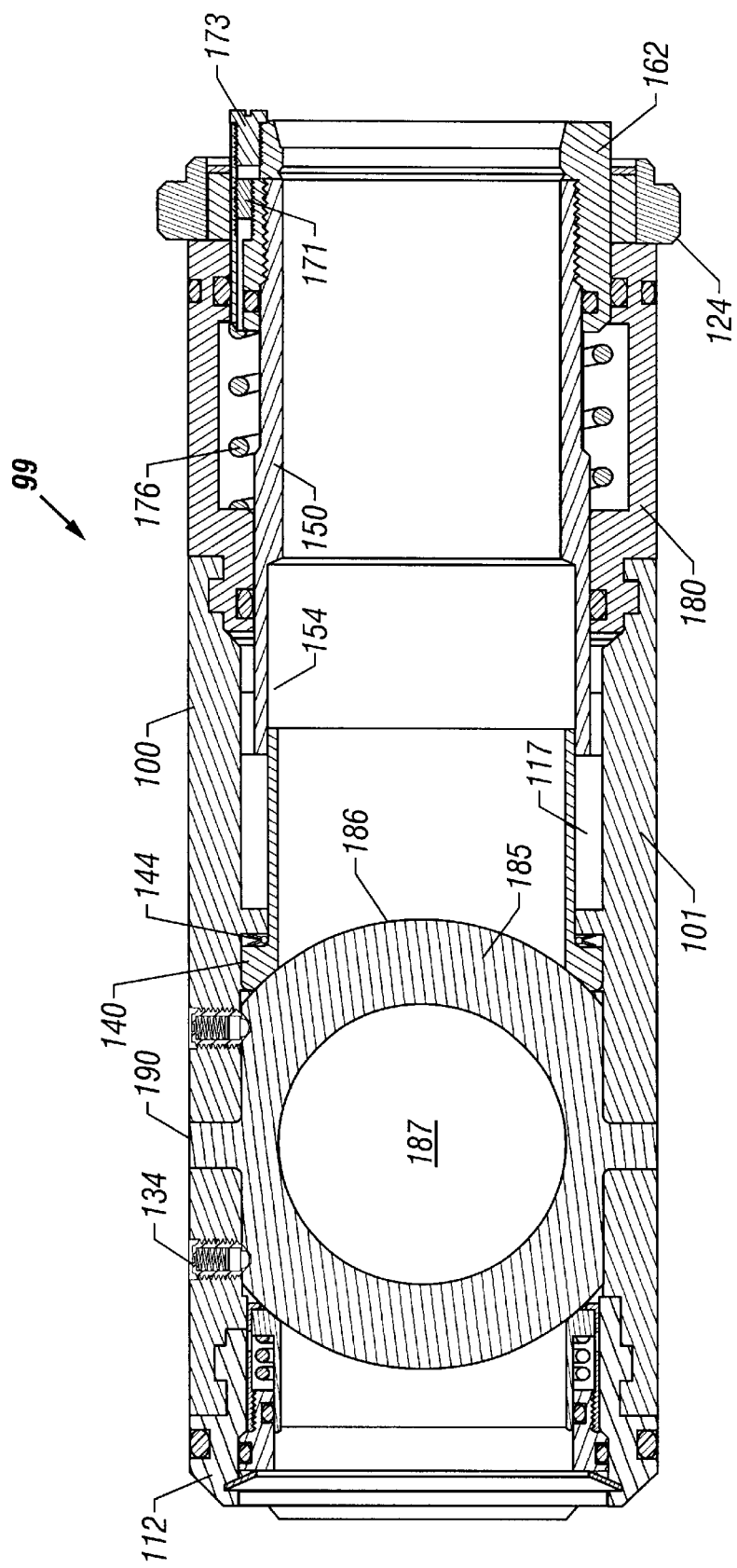
FIG. 15 is a longitudinal section along section line 15—15 of FIG. 13B.

The ball 185 has a generally spherical outer surface 186, a cylindrical through flow passage 187, and mirror-image opposed flat faces 188 equispaced from the axis of the through flow passage 187. The valve assembly operates by moving flow passage 187 into or out of alignment with the central flow passage of valve 99. In FIGS. 13A and 14A the flow passage 187 is in alignment with the central flow passage 103 and the valve is open. In FIGS. 13B and 15 the flow passage 187 is out alignment with the central flow passage and the valve is closed.

Figure 16:
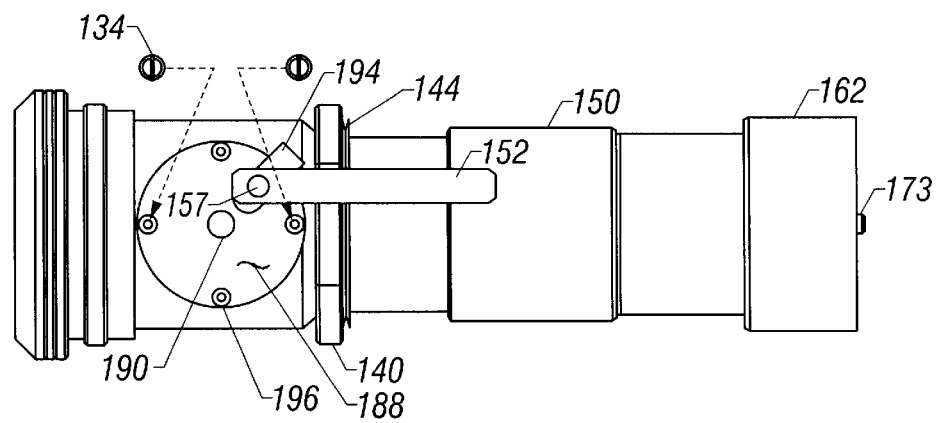
FIG. 16 is an external view of the ball valve cartridge interior elements without some of the outer elements shown, corresponding to FIG. 13A, showing the configuration of the flat face of the ball and the camming actuator.

Central to each of the flat faces 188 are concentric coaxial projecting cylindrical pins 190, with axes perpendicular to the flat faces 188 and the axis of the flow passage 187. Ball 185 is configured to rotate in a trunnion mount about its pins 190. Mirror-image camming grooves 194, as shown in FIG. 16, are provided in faces 188. Camming grooves 194 are both parallel to faces 188 and inclined at an angle of 45° to the axis of flow passage 187.

Figure 17:
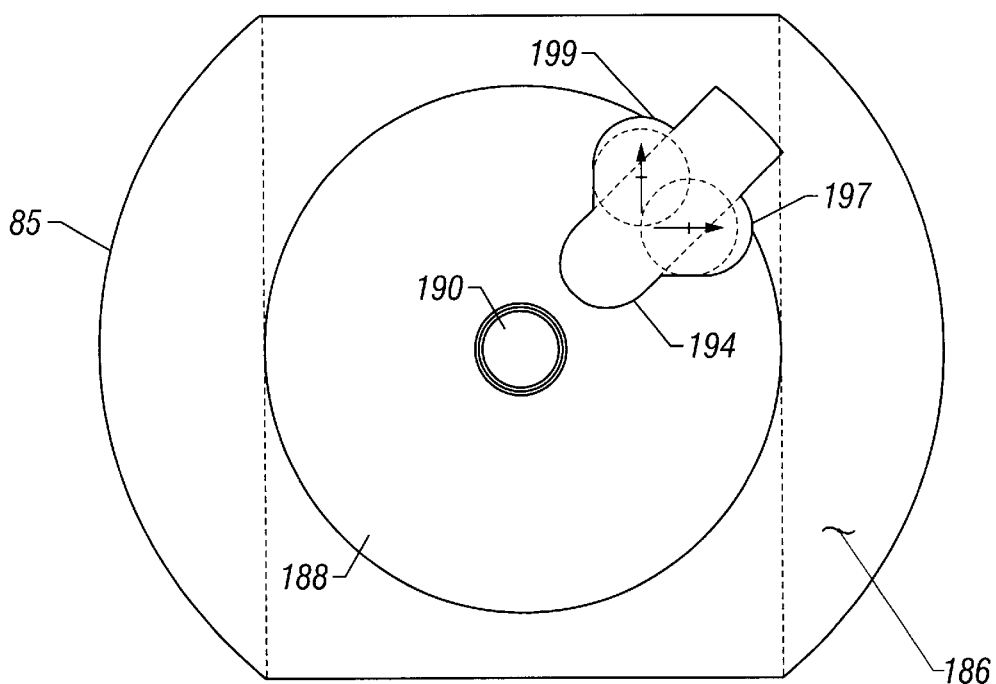
FIG. 17 is a top view of an alternate ball of the ball valve shown in FIG. 16, where for clarity the detents are not shown.

FIG. 17 illustrates an alternative arrangement of ball 185 with a camming groove 198 having a first 197 and second 199 overtravel groove to accommodate the overtravel of the eccentric actuator camming pin 157. The first overtravel groove 197 provides for camming pin 157 overtravel in closing the valve. The second overtravel groove 199 provides for overtravel of camming pin 157 in opening the valve. For clarity, detents 196 in faces 188 are not shown in this view.

Referring to FIG. 16, multiple detents 196 are located 90° apart in a circular array around ball pin 190 on face 188 of ball 185. Two detents are coplanar with the axis of the ball through hole 187 and the rotational axis of ball 185 defined by pins 190; the other two detents are in a plane perpendicular to that axis and through the rotational axis of the ball.

Figure 14B:
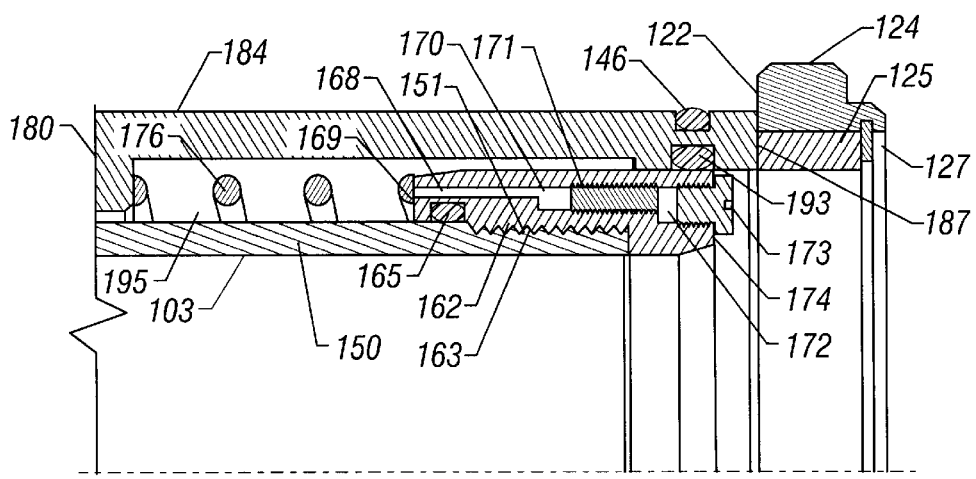
Figure 18:
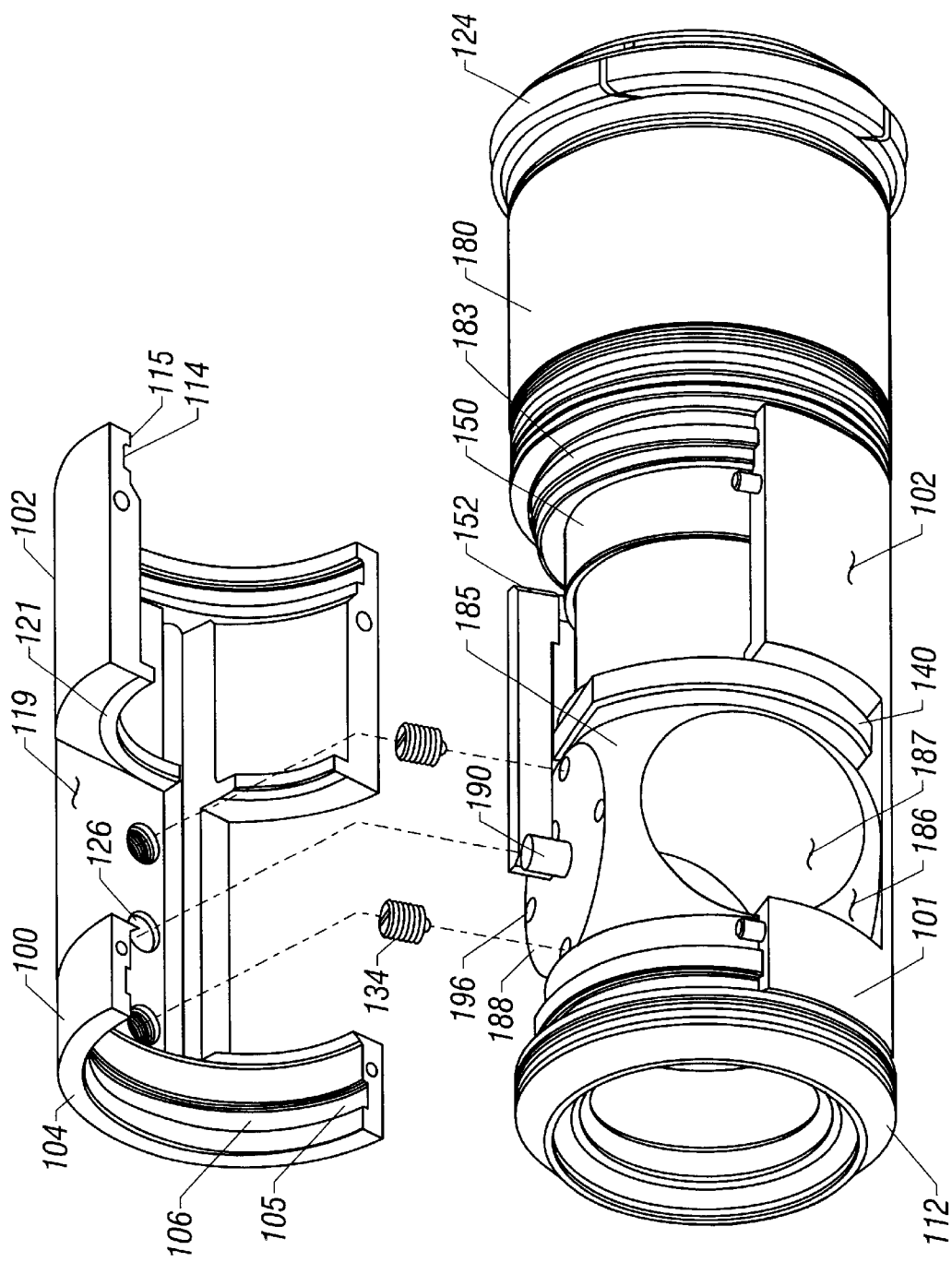
FIG. 18 is a partially exploded view of the valve cartridge shown in FIG. 13B.

Mirror-image split ball cage halves 100 and 101 provide support for the rotatable ball 185 as shown in FIG. 18. Because of general anti-symmetry between ball cage halves 100 and 101, only upper half ball cage 100 will be described. The upper half ball cage 100 has a generally half-cylindrical outer surface 102. The interior surface of cage half 100, as seen in FIGS. 14A, 14B and 18, is an annular half-ring with lower transverse face 104 and interior annular groove 105 having transverse lower shoulder 106.

Groove 105 mates with annular ridge 110 of seat holder 112 so that the seat holder 112 and upper ball cage 100 are keyed together. Diametrically-cut ends of the lower end of cage half 100 comate on a diametral plane with opposed similar ends on lower ball cage 101 in order to establish close control of the interrelationship of the mirror-image features of the two ball cage halves 100 and 101.

Referring to FIGS. 14 and 18, the top end on the inner surface of upper ball cage half 100 has an annular half-ring with an upper transverse face 113 and an interior annular groove 114 in its largest inner diameter upper cylindrical face 115. Diametrically-cut ends of annular upper face 113 comate and abut similar ring ends of the lower half ball cage 100. Diametrically-cut upper and lower ends of the ball cage 100 are coplanar.

Intermediate diameter cylindrical bore 116 of ball cage half 100 defines the outer side of a half-cylindrical annular cavity 117. The lower side of annular cavity 117 is defined by an annular ridge 120 facing inward. This annular ridge 120 has a lower transverse face 121 that provides a reaction shoulder for at least one spring 144. Spring 144, reacting against faces 141 of dirt excluder 140 and transverse face 121 of upper half ball cage 100, may be a set of Bellville washers or other known spring type.

Intermediate to the length of upper ball cage half 100, parallel to the upper and lower diametral plane of ends of ball cage half 100, and configured to fit closely to flat 188 of ball 185 is planar surface 124. Surface 124 extends downwardly from transverse face 121 to the bottom end of cage half 100, providing clearance and support for the ball 185 and clearance for the dirt excluder 140. The portion of upper half ball cage 100 between outer cylindrical surface 102 and planar surface 124 also provides structural support for the valve elements engaged with grooves 105 and 114.

A central through hole 126 perpendicular to planar surface 119 with its axis intersecting the longitudinal axis of the valve 99 journal pins 190 of ball 185 so that the ball is rotatable about its axis perpendicular to the longitudinal axis of the valve 99.

Returning to FIGS. 13A and 13B, elongated slot 130 is symmetrical about a plane which is normal to the diametral plane of upper and lower ends of ball cage 100 and parallel to the longitudinal axis of the valve 99, but displaced laterally from the rotational axis provided by central through hole 126. The sides of slot 130 are perpendicular to the diametral plane of upper and lower ends of the ball cage 100 and the projection of the slot on said diametral plane is rectangular.

Drilled and tapped holes 133 are located on each side of pin 190 in the plane defined by the axis of central through hole 126 and the longitudinal axis of valve 99. One or more commercially available threaded-body spring plungers or ball plungers 134, such as those shown in the Carr Lane Manufacturing Co. 1998 Catalog Component Parts of Jigs and Fixtures as items CL-70-SPS-1 or CL-70-SBP-3, are mounted in tapped holes 133 to engage ball detents 196 when the ball 185 is rotated into a suitable position. As shown in FIG. 14A, two spring plungers 134 on the upper half ball cage 100 are used in this embodiment. Although not shown in FIG. 14A, lower half ball cage 101 may or may not be provided with plungers.

Dirt excluder 140, as shown in FIG. 14A, is reciprocably housed within the top end of the interior of the upper and lower half ball cages 100 and 101. Dirt excluder has a straight through bore which serves as a portion of the main flow passage through the valve 99, an elongated thin-walled cylindrical upper body, and an upset head with transverse upper face 141 and spherical lower face 142 which mates with spherical face 186 of ball 185.

Spring 144 is positioned between upper transverse face 141 of dirt excluder 140 and lower transverse face 121 of upper half ball cage 100 and the corresponding face of lower half ball cage 101. Spring 144 biases spherical lower face 142 of dirt excluder 140 against surface 186 of ball 185 to effect a seal at their interface. Different types of biasing springs may be used such as a coil spring or, as shown, one or more Belleville spring washers.

Camming arm unit consists of a tubular body 150 with external threads 151 at its top end and mirror-image projecting camming arms 152 extending downwardly parallel to a diametral plane through the longitudinal axis, but offset from said axis. This can best be seen in FIGS. 16 and 18. Camming arm unit is reciprocable within the half ball cages 100 and 101.

The interior surface of the top end of the tubular body 150 of the camming arm unit serves as a portion of the primary fluid passageway through the valve 99. The bottom portion of the tubular body bore 154 is enlarged in order to clear the upper end of dirt excluder 140 and provide a narrow annular flow passage between bore 154 and the exterior of dirt excluder 140.

The exterior of the tubular body 150 of the camming arm unit has two different outer diameters below the threaded top end. The second, larger outer diameter section has outwardly extending projections to which the offset parallel camming arms 152 are mounted as shown in FIG. 18. The inner faces of the camming arms are equispaced from the longitudinal axis of the valve and clear the flat face 188 of ball 185.

Near the bottom end of the camming arms 152 are coaxial pin-mounting holes which are located in the offset plane of the camming arms. Stepped cylindrical camming pins 157 have their smaller diameter press-fitted into the pin-mounting holes. The larger ends of the camming pins 157 are positioned on the inner side of camming arms 152 and engage the mirror-image camming grooves 194 of ball 185. The camming arms 152 can reciprocate in the slot 130 of upper half ball cage 100 and the mirror-image lower ball cage 101 whenever the camming arm unit is reciprocated within the bore of the half ball cages. Because the pins 190 of ball 185 are journaled in central through hole 126 of upper half ball cage 100 and the corresponding hole in lower half ball cage 101, off-center forces imparted from camming pins 157 to the camming grooves 194 of the ball 185 will tend to cause ball 185 to rotate about its journaled axis. Downward forces applied to the camming arm unit will tend to open the ball 185, while upward forces will tend to close the ball.

Annular piston 162 is coaxially attached by interior female screw threads 163 to the male threads 151 of the top end of camming tubular body 150. An internal shoulder of piston 162 abuts the top end of camming arm unit 150 to serve as a travel stop during thread make-up. A female O-ring groove is located below threads 163 and contains O-ring 165. O-ring 165 seals between the interior bore of piston 162 and the unthreaded upper portion of camming arm unit 150. The moving seal surface for the piston 162 is its outside cylindrical surface. The upper transverse face of piston 162 is exposed to the mud pressure from hydrostatic pressure or combined pump and hydrostatic pressure. A through hole 168 is drilled parallel to the flow axis for valve 10 through the body of piston 162, emerging on lower transverse face 169 of piston 162. Another larger hole 170, intersecting through hole 168, is bored partially through the piston body on an axis parallel to that of hole 168, but slightly offset from hole 168.

A Schrader valve 171 of the type commonly used as a fill valve for air-conditioning systems or tires is either press-fitted in as shown or, alternatively, mounted in internal threads provided in the bore of hole 170. Schrader valve 171 seals against the walls of hole 170, thus controlling admission of fluid or gas to and from the region below piston 162. An upper hole 172 is provided that is larger, yet shallower, than hole 170. Upper hole 172 is parallel to and intersects hole 170. Hole 172 is provided with female threads which comate with the male threads of seal screw 173 which is installed in hole 172 in order to fully isolate Schrader valve 171.

Upper transverse face 174 of piston 162 is thus connected to lower transverse face 169 by the flow path constituted by intersecting holes 168, 170, and 172. Flow is controlled through this flow path by Schrader valve 171, while selectively removable seal screw 173 prevents flow access to Schrader valve 171 when installed. Piston bias coil compression spring 176, located adjacent the upper cylindrical outer surface of camming tubular body 150, bears against lower transverse face 169 of piston 162 in order to urge the piston upwardly.

Reference chamber 180 is located exterior to and coaxial with camming tubular body 150 and piston 162. On the lower end, reference chamber 180 has two reduced diameter external cylindrical sections which have annular transverse ridge 183 positioned therebetween. Annular ridge 183 is configured to engage annular internal groove 114 of upper half ball cage 100 and the corresponding groove of mirror-image lower half ball cage 100.

Larger external cylindrical surface 184 closely fits to the central bore of the body of valve 99. Cylindrical surface 184 has a male O-ring groove located near its upper end, with O-ring 186 mounted therein. Transverse upper shoulder 187 abuts shoulder 122 of the segmented locking rings 124 so that the internals of valve 99 are retained within the valve cartridge. Segmented locking rings 124 are constrained internally by backup ring 125, which is axially restrained by snap ring 127, which is seated in an interior groove in locking rings 124.

O-rings 146 and 147 prevent fluid passage around the outside of the valve internals. O-rings 156 and 161 prevent fluid passage around the seat biasing piston 150 and the seat 175 which is engaged against ball 185.

The interior of reference chamber 180 has an upper end first cylindrical section with a female O-ring groove having an O-ring 193, an enlarged bore intermediate cylindrical section, and a reduced diameter cylindrical section with a female O-ring groove and O-ring 194 positioned therein at the lower end. O-ring 194 seals against the external cylindrical surface at the upper end of camming tubular body 150. The annular space in between reference chamber 180, piston 162, and camming tubular body 150 between O-rings 193 and 194 constitutes a pressure-containing chamber 195 to which the piston 162 is exposed on its lower transverse face 169. This chamber can be selectively precharged through Schrader valve 171 mounted in piston 162 whenever seal screw 173 is removed.

Piston bias spring 176 is located within chamber 195 and bears against the lower interior transverse face of reference chamber 180. Chamber 195 is pressure-isolated by O-rings 193, 194, and 165 and seal screw 173.

Flow passages between camming arms 152 and dirt excluder 140 and between seat holder 112 and travel limiter 303, as well as clearance gaps between ball 185 and ball cage halves 100,101 allow pressure communication to the lower side of the ball and the components located therein.

The ball 185 is sealingly engaged on its lower side (or valve outlet side) with a reciprocable valve seat 301. A travel limiter 303 is positioned to interact with the upper end of the valve seat 301. A biasing piston 305, threadedly attached to the travel limiter 303, will cause the travel limiter to move in the same direction as the biasing piston 305. The biasing piston 305 is pressure responsive, where the inlet pressure will urge the biasing piston toward a lower position and outlet pressure will urge the biasing piston toward an upper position. A preloaded spring 308 biases the biasing piston 305 toward its upper position.

Whenever, sufficient inlet pressure force is applied to the preloaded spring 308 to overcome the preload of the preloaded spring, the biasing piston moves towards its lower position, pulling the travel limiter with it such that it interacts with the valve seat 301 to disengage the valve seat 301 from the outlet side of the ball 185.

The general opening and closing operation of the valve 99 is as follows. The ball 185 of the valve 99 is caused to rotate from a closed position to an open position as a consequence of pressures applied to pressure-responsive actuating piston 162. Biasing forces are applied to piston 162 in order to maintain ball 185 closed. Normally, spring 176 provides sufficient bias to keep the valve closed for most normal conditions. The strength of the spring is based upon the amount of pressure desired to be retained. However, additional valve closing bias can be applied by introducing air or nitrogen pressure into chamber 195, so that it will exert additional valve closing forces on piston 162.

It is undesirable for a ball valve to be either partially open/partially closed where it is susceptible to flow-induced wear. The forces acting on the piston 162 as a function of distance of travel for valve opening are friction, the bias spring force, the gas pressure force, the detent resistance, and the mud pressure force. Both friction and the spring force are predetermined; the gas pressure is adjustable and is set as desired. The detenting force is also selectively controllable as described previously.

Interaction of spring pins 134 with detents 196 on face 188 of ball 185 provides forces which resist movement of the fully-open or fully-closed ball 185 by the forces applied to piston 162 and thence to the ball 185 by camming arms 152 and camming pins 157. The configuration of detents 196 is selected to coact with the spring forces and spring pin nose geometry of spring pins 134 in order to provide specific forces resisting ball movement. Once resisting forces are overcome by pressure applied to upper traverse surface 174 of piston 162, the unbalanced pressure force is sufficient to cause movement fully to the new position. For example, when the bias of spring 176, precharge pressure in chamber 195, and the resistance of spring pins 134 in the detents 196 of closed ball 185 are overcome by pump or other valve inlet side pressure, the overcoming pressure will force the ball to an open position.

The excess pressure required to initiate movement of the ball is strictly due to the snap-through action obtained from the resistance of spring pins 134. The spring pin resistance drops to a negligible value after the pin escapes from detent 196. Excess pressure is necessary to overcome the increase of forces from compression of spring 176 and the gas in chamber 195 that occurs with the opening travel of piston 162, as well as to overcome possible variations in friction involved in moving the ball.

Excess force on the piston is also required to move the valve from the open position of to the closed position. For valve closing, the closing effort provided by the spring bias and the gas pressure force have to overcome friction, the pressure of upper transverse face 174 of piston 162, and the detent forces. The detent forces should be such that, when the pressure on piston face 174 drops sufficiently, the gas pressure force and the spring bias will be adequate to overcome friction and thereby ensure full closure. By varying the strength of spring pins 134 and the slope and depth of the detents 196 which influence valve opening and closing, the resistive forces of the snap-action mechanism can be made direction dependent.

When the biasing forces on piston 162 and the detent-induced forces on the ball are exceeded, the force on piston 162 is sufficient to move the piston and the attached camming arm 152 downwardly toward the ball 185. As camming arm 152 moves, its attached camming pins 157 interact with camming grooves 194 of ball 185 to cause ball rotation. The reverse action occurs for reclosure of the valve.

EXAMPLE 9

A Ball Valve Having a Coil Spring Snap Action Means on the Ball

Figure 19:
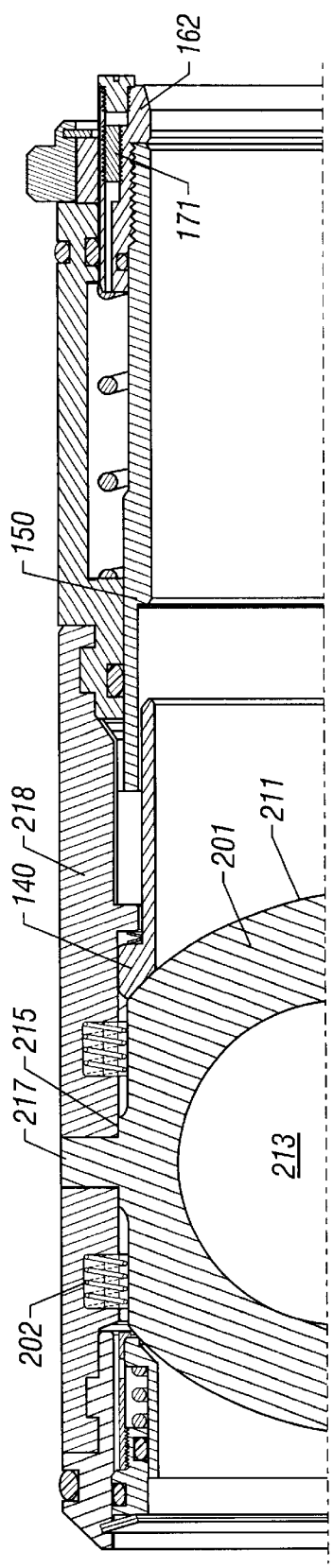
FIG. 19 is a longitudinal half sectional view of a closed ball valve having a coil spring providing biasing force engaged in detents of the top face of the ball.
Figure 21:
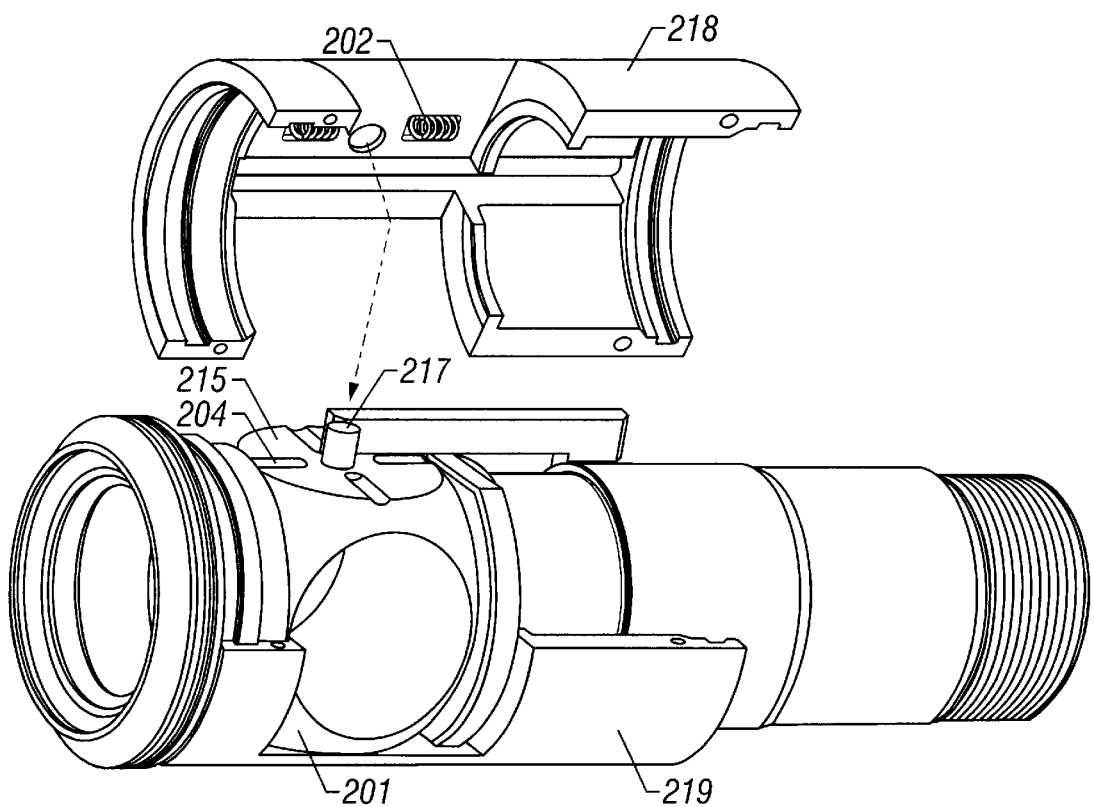
FIG. 21 is a partially exploded view of the valve shown in FIG. 19.

The valve in Example 9 is basically like the valve in Example 8, except it that uses a different spring-loaded means for detenting the ball. As illustrated in FIGS. 19 and 21, the piston 162, the Schrader valve 171, the camming tubular body 150, the camming arms 152, the biasing spring 144, and the dirt excluder 140 are all the same as in Example 8 and operate in the same manner. The difference between the two valves is the spring-loaded detent means. Whereas Example 8 uses a spring-pin spring-loaded means, Example 9 uses a linear coil spring. Special types of coil construction such as those discussed for Example 5 may be utilized, or conventional helical springs could be used.

Figure 20:
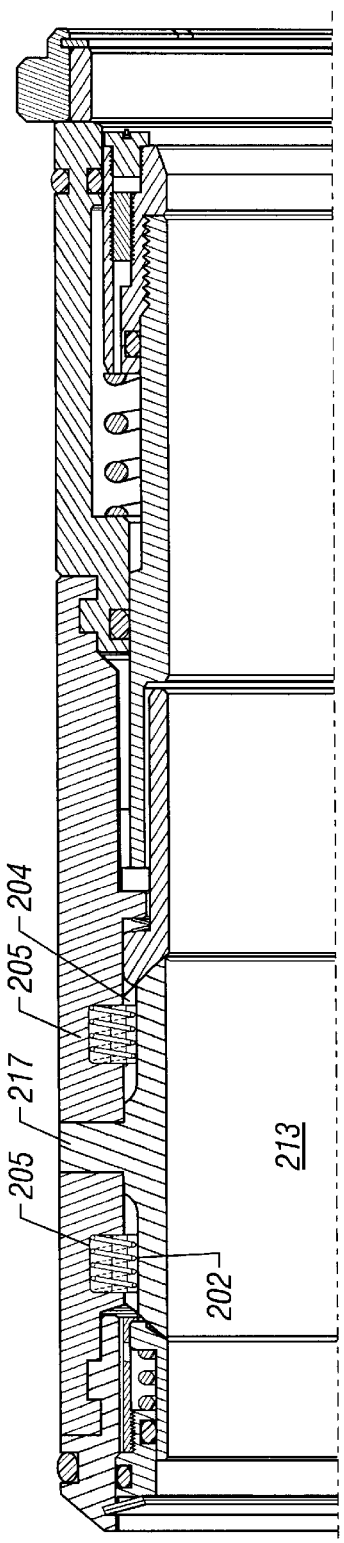
FIG. 20 is a longitudinal half sectional view of the ball valve shown in FIG. 19 in an open position.

The ball 201 has a generally spherical outer surface 211, a cylindrical through flow passage 213, and mirror-image opposed flat faces 215 equispaced from the axis of the through flow passage 213. The valve assembly operates by moving flow passage 213 into or out of alignment with the central flow passage of the valve. In FIG. 20 the flow passage 213 is in alignment with the central flow passage and the valve is open. In FIGS. 19 and 21 the flow passage 213 is out alignment with the central flow passage and the valve is closed.

Central to each of the flat faces 215 are concentric coaxial projecting cylindrical pins 217, with axes perpendicular to the flat faces 215 and the axis of the flow passage 213. Ball 201 is configured to rotate in a trunnion mount about its pins 217. Mirror-image camming grooves 194, like those shown in FIG. 16, are provided in faces 215. Camming grooves 194 are both parallel to faces 215 and inclined at an angle of 45° to the axis of flow passage 213.

Multiple elongated detents 204 radial to the faces 215 are located 90° apart in a circular array around ball pin 217 on face 215 of ball 201. Two detents are coplanar with the axis of the ball through hole 213 and the rotational axis of ball 201 defined by pins 217; the other two detents are in a plane perpendicular to that axis.

Mirror-image split ball cage halves 218 and 219 provide support for the rotatable ball 201 as shown in FIG. 21. Because of general anti-symmetry between ball cage halves 218 and 219, only upper half ball cage 218 will be described. The upper half ball cage 218 is basically the same as that shown in FIG. 18 for Example 8, the major difference being the means for mounting the spring-loaded means. In Example 8, the top ball cage half 100 has threaded holes 133 into which the spring-pins are mounted. In Example 9, a pair of coil springs 202 are situated in a pair of grooves 205, located on each side of the pin 217, in the ball cage half 218. The groove 205 is slightly wider than the coil spring 202 in order to allow the coil spring 202 room to flatten as it is compressed.

The grooved detents 204 are generally oblong and sized so that coil spring 202 fits into the detents 204. Interaction of the coil springs 202 with the detents 204 on face 215 of ball 201 provides forces which resist movement of the ball 201 to a fully open or a fully closed position. Once these resisting forces are overcome by pressure applied to the upper surface 174 of piston 162 and thence to the ball 201 by the camming arms 152, the excess pressure is sufficient to cause rotation of the ball to the new position as described above for Example 8.

The excess pressure required to initiate movement of the ball is due to the snap-through action obtained from the resistance of coil springs 202 to compress in order to move out of detent 204. Once compressed and out of detent 204, the coil spring 202 will slide across the flat face 215 of the ball 201 relatively easily. Thus, the forces required to rotate the ball are governed by the same characteristics as in Example 8. Such forces govern the ball rotation in either direction so that snap action is achieved in both directions.

EXAMPLE 10

A Ball Valve Having a Spring-Pin Snap Action Means on the Actuator

Example 1 illustrated the interaction of a spring-pin with two grooved detents on an actuator. Example 10 incorporates the same spring-pin mechanism described for Example 1, but the spring-pin mechanism is applied to the rotation of a ball valve.

Figure 22:
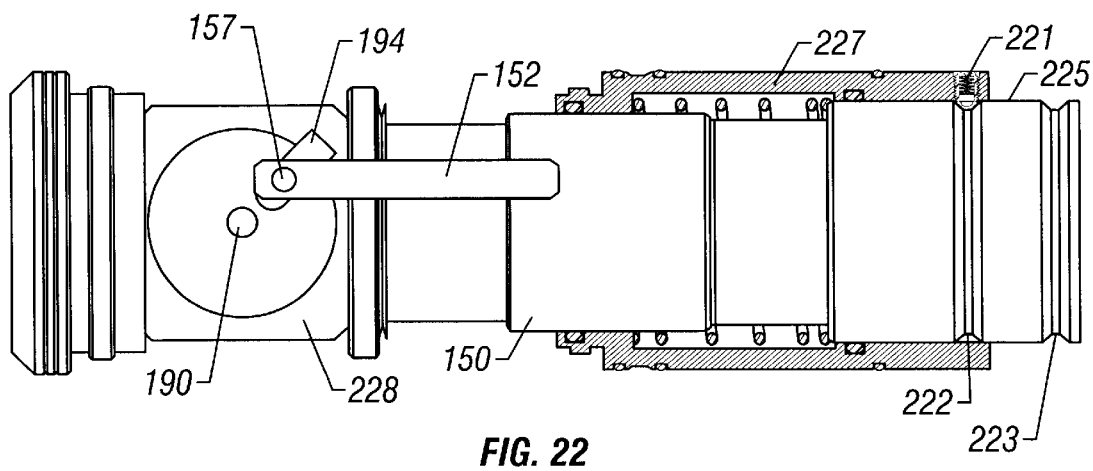
FIG. 22 is an external view of a ball valve cartridge interior elements without some of the outer elements shown and one element in section, where the actuator has two detents and a spring pin providing biasing detenting force engaged in one detent.

FIG. 22 illustrates the valve embodiment of Example 10. Here a spring-pin 221 spring-loaded means is threaded through the reference chamber 227 cylinder wall to interact with either a first groove 222 or a second groove 223. Interaction of the spring-pin 221 with the grooves 222 and 223 on the piston head 225 provides forces which resist movement of the ball 228 to a fully open or a fully closed position. Once these resisting forces are overcome by pressure applied to the piston head 225 and thence to the ball 228 by the camming arms 152, the excess pressure is sufficient to cause movement of the piston head 225 to the new position where the spring-pin 221 interacts with the other groove.

The excess pressure required to initiate movement of the ball is due to the snap-through action obtained from the resistance of spring-pin 221 to move out of first groove 222. Once the spring-pin has moved out of groove 222, the spring-pin 221 will travel along the surface of the piston head 225 relatively easily. Thus, the forces required to rotate the ball are governed by the same forces discussed in the opening and closing of the valve in Example 1. Whenever the piston head moves, the spring-pin will move from one groove to the other groove thereby causing the ball 228 to move in a snap acting manner.

EXAMPLE 11

A Ball Valve Having a Garter Spring Snap Action Means on the Actuator

Example 5 illustrated the interaction of a garter spring with grooved detents on an actuator. Example 11 incorporates the same mechanism described for Example 5, but the garter spring biasing mechanism is applied to the actuator for control of the rotation of a ball valve.

Figure 23:
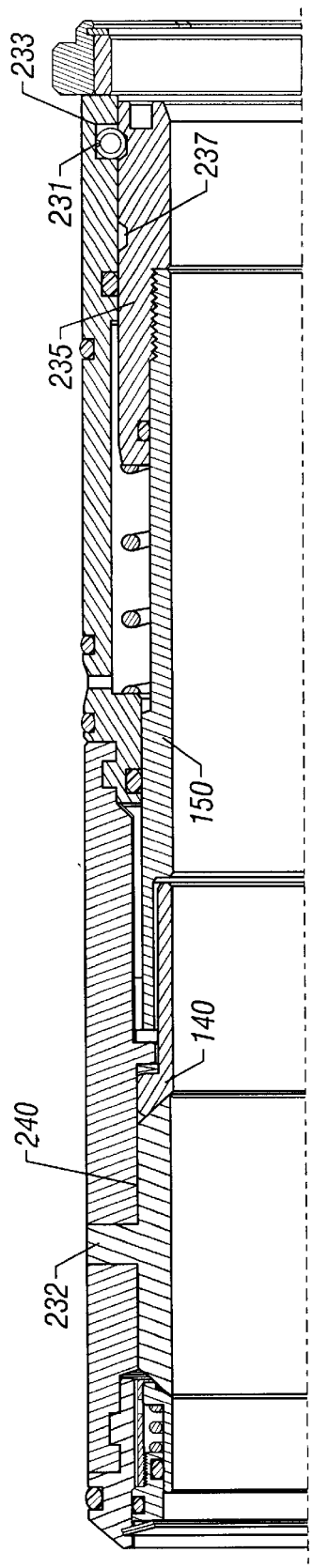
FIG. 23 shows a longitudinal half section of an open ball valve having a garter spring providing biasing detenting force engaged in a first detent on the actuator.
Figure 24:
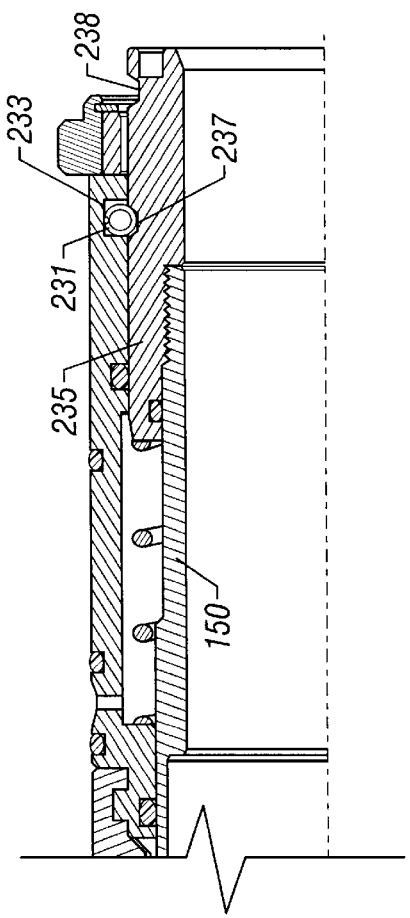
FIG. 24 shows a partial longitudinal half section of the ball valve of FIG. 23 with the ball in a closed position.

FIGS. 23 illustrates the valve embodiment of Example 11. Here a garter spring 231 is housed in an annular groove 233 and interacts with either a first groove 237 or a second groove 238. Interaction of the garter spring 231 with the grooves 237 and 238 on the piston 235 provides forces which resist movement of the ball 240 to a fully open or a fully closed position. Once these resisting forces are overcome by pressure applied to the piston 235 and thence to the ball 240 by the camming arms 152, the excess pressure is sufficient to cause movement of the piston 235 to the new position where the garter spring 231 interacts with the other groove. Ball 240 concurrently rotates about coaxial pins 232.

Garter spring 231 has a cross-section diameter that normally extends into and causes interference with the detent 233 in the valve housing, such that escaping from detent 233 requires that the garter spring 231 be compressed laterally in a radial direction with sufficient force that it will displace enough to clear the detent and the rest of the surface adjacent to the detent. In this Example 11, when the piston moves from one position to another the garter spring 231 will move from one groove to the other groove thereby causing the ball 240 to rotate.

Once the forces resisting movement of the piston 235 are overcome by pressure forces applied to the piston 235 and thence to the ball 240 by the camming arms 152, the excess pressure is sufficient to cause movement of the piston 235 to the new position where the garter spring 231 interacts with the other groove. The forces required to rotate the ball are governed by the same forces discussed in the opening and closing of the valve in Example 5.

EXAMPLE 12

A Ball Valve Having a Magnetic Snap Action Means on the Actuator

Example 6 illustrated the interaction of a magnetic snap action means on an actuator. Example 12 incorporates a very similar magnetic mechanism described for Example 6, but applies the magnetic snap action means to the actuator for controlling the rotation of a ball valve. The application of the magnetic mechanism to a ball valve uses the same type of piston and the same camming mechanism of Examples 10 and 11. Thus, only the magnetic mechanism and the piston of this embodiment will be discussed.

Figure 25A:
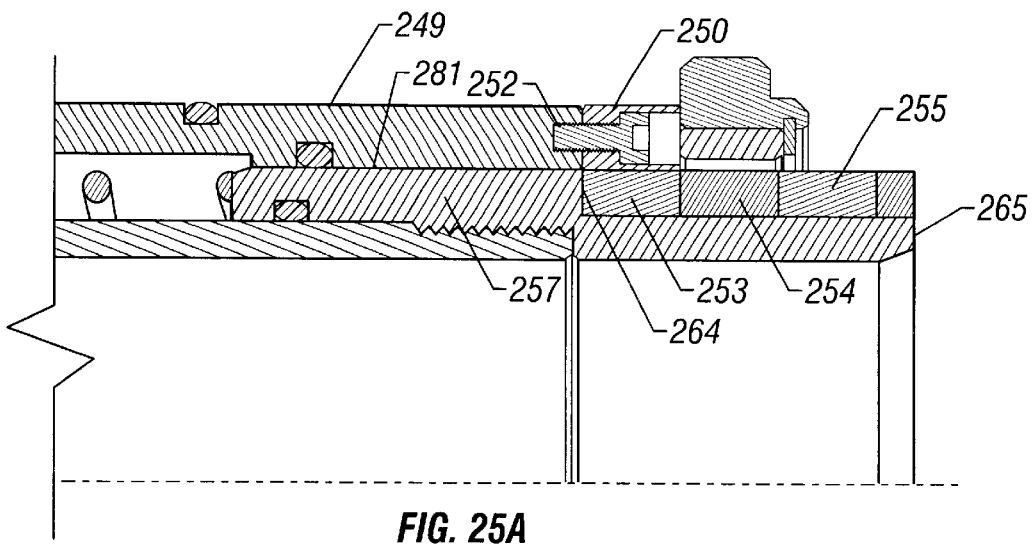
FIG. 25A shows the actuator of an open ball valve, where a magnet on the body of the valve is attracted to a first element of magnetic material to provide biasing detenting force.
Figure 25B:
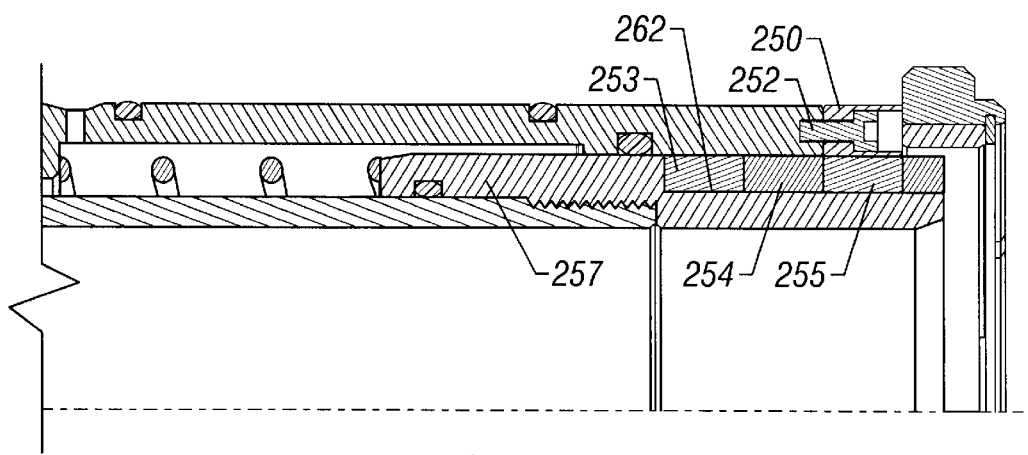
FIG. 25B shows the actuator of the ball valve of FIG. 25A in a closed position, where a magnet on the body of the valve is attracted to a second element of magnetic material.

FIGS. 25A and 25B show the piston in a first and a second position. The bias chamber 249 has an annular magnet 250 attached at its upper end with bolts 252. The piston 257 has a reduced diameter shank 262 at its upper end. Secured on the shank 262 are two annular rings 253 and 255 made of magnetic material, such as iron or soft steel. The two annular rings 253 and 255 are approximately the same width as the magnet 250 and axially spaced to reflect the distance that piston 257 moves in going between its first and second positions. The first annular ring 255 is located at the upper end of the valve, while the second annular ring 253 is adjacent a lower traverse shoulder 264 of the first counterbore 262 of piston 257.

The upper end 265 of piston 257 is exposed to pump or other external pressure forces. As the valve opens and closes, the piston 257 reciprocably moves within the bias chamber first cylindrical counterbore 281 such that either the first annular ring 253 or the second annular ring 255 will interact with the magnet 250.

An interposed piece of non-magnetic material 254 is located between the two annular rings 253 and 255. The width of this non-magnetic material 254 can be adjusted to regulate the force necessary for the annular ring 253 or 255 to escape its interaction with the magnet. Additionally, shims may be used between magnet 250 and bias chamber 249 to adjust the relative position of magnet 250 relative to its target rings 253 and 255 when detented.

When the piston is in the second position, the second annular ring 253 is attracted to and interacts with the magnet 250 and the valve is open, as shown in FIG. 25A. The interaction of the magnet 250 with the magnetic material of the second annular ring 253 provides forces that resist movement of the piston from the second position to the first position and the closing of the valve. Once these resisting forces are overcome by pressure forces applied to the lower surface of the piston 257, the unbalanced pressure force is sufficient to cause movement fully to the first position.

The excess pressure required to initiate the axial movement of the piston 257 is strictly due to the snap through action obtained from the attraction of the magnet 250 to the annular rings 253 and 255. Excess pressure is necessary to overcome this attractive force, but once sufficient force is present to separate the piston 257 from the annular ring, the attractive force between the magnet 250 and the annular ring rapidly diminishes so that the pressure force applied is sufficient to move the piston to its other position. As the piston 257 is moved close to its second position, the annular rings becomes aligned with the magnet and the attractive force between the magnet 250 and other annular ring assists in moving the piston to its other position.

EXAMPLE 13

Provisions for Actuator Overtravel

Due to variations in fabrication tolerances and the need for varying adjustments to the detenting and biasing forces, certain types of actuators may at times require "overtravel." A means of dealing with such actuator overtravel is needed so that the actuator will always deliver a specific amount of actuation motion to the valve sealing element. The provision of actuation overtravel permits compensating for the tolerance stackup of the actuator parts and extended detenting strokes for certain types of detents so that it can be ensured that the actuator will provide at least a minimum stroke to the valving element.

For a linearly shifting valving member, such as in a poppet or spool valve, addition of a lost motion joint between the actuator rod and the valving member allows for overtravel due to the tolerance stackup of the actuator parts. The ends of the lost motion joint may have low spring rate springs interposed between the actuator rod and the valving member to maintain some force between the two members.

Where the spring biasing force is a spring-pin or garter spring some finite travel is needed before the full detent resistance is developed. Overtravel in these spring mechanisms, as well as canted springs or magnetically detented actuators, is handled by modifying the actuator stroke length and/or fine adjustments to the detenting and biasing forces. Such modifications and adjustments for the canted springs or magnetically detented actuators can assist in controlling the breakaway detenting forces.

In the case of a poppet valve, the deformation of an elastomeric seat can suffice to provide such overtravel action. Although spool valves do not require as much precision as poppet valves, travel limit stops may be required to limit spool valve travel when a mechanism requiring a lost motion link between the actuator and valving element is required.

For a ball valve or other quarter-turn valve which utilizes an off-center camming pin driven by the actuator and working against an eccentric slot on the valving member, lost motion is provided by an escapement slot for one or both travel directions of the camming pin after the valving member has rotated 90° as shown in FIG. 17. The usual primary slot is inclined at an angle of 45° to the axis of the through hole in the valving member and the actuator stroke axis is parallel to the plane defined by the valve through hole axis open and closed positions. For this usual case, the axis of actuator motion is inclined 45° and 135° to the camming slot when the valve is in its respective closed and open positions. When the valving member is rotating under the driving action of the camming pin, the pin abuts the transverse side of the slot. However, when the valving member has reached the limit of its stroke for a given direction of opening or closing travel, the slot is interrupted by machining away its side so that the camming pin will not abut the transverse side of the slot. This is shown in FIG. 17, where escapement slots inclined at 45° angles to the main slot are shown for both directions of actuator travel. Another example of a similar overtravel mechanism on a ball valve can be seen in U.S. Pat. No. 4,130,166.

Advantages of the Present Invention

The actuator of this invention when combined with a two position valve provides a valve that has an extended reliable service by avoiding fluid erosion of valve components caused by fluid wear on a partially open or closed valve. The valve avoids this fluid erosion by using a bi-directional, bi-stable snap action for the opening and closing of the valve.

The present invention also allows for the adjustment of the resistive forces and their associated travel lengths governing the snap action of the valve.

In addition, the bidirectional snap action mechanism may be applied directly to the valve sealing element or to the valve actuator.

Further, it may be seen that the examples of bidirectional bi-stable snap action means applied directly to the rotary valving means could as easily be applied to rotary actuators.

It may be seen from the foregoing description that this actuator when applied to a valve provides a definite improvement in the operation of valves, enabling improvements in service life and ease of operation. The disclosed actuator combined with a valve results in a valve that will perform substantially better in abrasive service than conventional valves, due to the avoidance of flow concentration during initial valve opening and final valve closing. It is to be understood that this invention is not limited in its application to the details of construction and the arrangement of components set forth in the description or illustrated in the drawings. The invention is capable of other embodiments and of being practiced and carried out in various ways. For example, spring loaded balls could be substituted for spring pins. Also, it is to be understood that the phraseology and terminology employed herein is for the purposes of description and should not be regarded as limiting.

What is claimed is:

1. A ball valve comprising
   a tubular valve body having a through bore flow passage, said body having an upper inlet end and a lower outlet end;
   a nontranslating rotatable ball having a through hole, said ball rotatable between a first and a second end position about coaxial central pivot pins, wherein when said ball is in the first end position the ball through hole is aligned with said bore flow passage and when said ball is in the second end position said ball through hole is misaligned with said bore flow passage preventing flow through said bore flow passage;
   support means for supporting said ball;
   sealing means for sealingly engaging a surface of said ball;
   reciprocable camming means for fully rotating said ball between said first and second end positions;
   a detenting mechanism interacting with the ball to retain the ball in either end position until sufficient force is applied to the ball to overcome the interaction of the detenting mechanism with the ball; and
   actuating means for actuating the displacement of said camming means to rotate the ball;
   whereby when said actuating means applies sufficient force to said camming means to overcome the interaction of the detenting mechanism with the ball, the ball will fully rotate from a current end position to the other end position.

2. The valve of claim 1, wherein said ball, sealing means, support means, camming means, the detenting mechanism, and actuating means are assembled together to form a modular valve cartridge that fits within the tubular valve body.

3. The valve of claim 1, wherein the camming means comprises:

a cylindrical tubular body;

two mirror image arms parallel to the axis of said tubular body and laterally offset from said axis; and two coaxial inwardly protruding camming pins perpendicular to the axis of said tubular body and offset therefrom, one camming pin mounted on each arm and engaging a camming groove, wherein one camming groove is located on and integral to each of a pair of opposed flat faces of the ball;

whereby reciprocation of the camming means causes said camming pins to interact with said camming grooves to rotate the ball.

4. The valve of claim 3, wherein each camming groove extends radially parallel to the flat face of the ball at an angle to the flow axis of said ball through hole.

5. The valve of claim 3, wherein each camming groove has one or more mirror-image overtravel relief grooves to accommodate overtravel of said camming pins as the actuator moves from one end position to the other end position, each overtravel relief groove corresponding to one of the ball end positions, wherein said overtravel relief grooves serve to permit lost motion between said ball and said camming means, thereby preventing said ball from rotating past its said other end position.

6. The valve of claim 1, wherein said actuating means is a force and pressure responsive annular piston.

7. The valve of claim 6, wherein said piston is subjected to a valve inlet pressure on a first face and a bias force on a second face obverse to said actuating means first face, wherein said bias force includes a gas pressure force or a bias spring force or both.

8. The valve of claim 6, wherein said piston is subjected to a valve inlet pressure on a first face and a bias force on a second face obverse to said actuating means first face, wherein said bias force is a gas pressure force.

9. The valve of claim 8, wherein said bias force is adjustable by varying the gas pressure.

10. The valve of claim 1, wherein said detenting mechanism is a spring-pin mounted in the support means for said ball and engaging one or more detents located on a surface of said ball.

11. The valve of claim 10, wherein the force necessary to overcome the interaction of the spring-pin with the detent on the ball is determined by selecting a spring preload and a spring rate of the spring pin and a slope and a depth of the detent.

12. The valve of claim 1, wherein said detenting mechanism is a coil spring mounted in the support means for said ball and engaging one or more detents on said ball.

13. The valve of claim 12, wherein the force necessary to overcome the interaction of the coil spring with the detent on the ball is determined by selecting a spring rate of the coil spring and a slope and a depth of the detent.

14. In a two position ball valve with coupled actuator, the improvement comprising:

a ball valving element having two detents spaced to reflect a distance between a first and second end position of said valving element;

a detenting mechanism engaging the first detent when said valving element is in its first end position and said detenting mechanism engaging the second detent when said valving element is in its second end position;

a reciprocable camming device for fully rotating the ball valving element between the first and second end positions; and an actuator having a first and second end position corresponding to the first and second end positions of the valving element, wherein a force or torque applied to the actuator and transmitted to the valving element sufficient to disengage the detenting mechanism from the detent is sufficient to fully rotate the valving element to a different end position;

whereby when said actuator moves from either end position to the other end position, the valve fully moves to the other end position.

* * * * *